(12) United States Patent
Rothschild et al.

(10) Patent No.: US 10,601,798 B2
(45) Date of Patent: Mar. 24, 2020

(54) FEDERATED SERVICES MANAGED ACCESS TO SERVICES AND CONTENT

(71) Applicant: COX COMMUNICATIONS, INC., Atlanta, GA (US)

(72) Inventors: Keith Alan Rothschild, Atlanta, GA (US); Edgar V. Shrum, Atlanta, GA (US); Muhammad Asif Raza, Jr., Atlanta, GA (US); Richard M. Thomas, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/218,946

(22) Filed: Mar. 18, 2014

(65) Prior Publication Data

US 2014/0282918 A1    Sep. 18, 2014

Related U.S. Application Data

(60) Provisional application No. 61/802,207, filed on Mar. 15, 2013.

(51) Int. Cl.
  *H01L 29/06* (2006.01)
  *H04L 29/06* (2006.01)
(52) U.S. Cl.
  CPC .......... *H04L 63/08* (2013.01); *H04L 63/0815* (2013.01); *H04L 63/10* (2013.01)
(58) Field of Classification Search
  CPC ..... H04L 63/0815; H04L 63/10; H04L 67/16; H04L 67/70; H04N 21/4702; G06F 9/44505; G06F 11/3006

USPC ....................... 705/51; 725/58, 109, 115, 145
See application file for complete search history.

(56) References Cited

U.S. PATENT DOCUMENTS

| | | | |
|---|---|---|---|
| 6,119,154 A | 9/2000 | Weaver et al. | |
| 6,816,904 B1 | 11/2004 | Ludwig et al. | |
| 7,812,854 B1 | 10/2010 | Delker et al. | |
| 8,552,975 B2 | 10/2013 | Junh | |
| 8,566,461 B1 * | 10/2013 | Jun | G06F 21/10 709/225 |
| 8,677,406 B2 | 3/2014 | Berkoff | |
| 8,683,060 B2 | 3/2014 | Meketa | |
| 8,806,659 B1 | 8/2014 | Miazzo | |
| 8,873,751 B2 | 10/2014 | Knox et al. | |
| 8,893,194 B2 | 11/2014 | Baumgartner et al. | |
| 8,990,911 B2 * | 3/2015 | Olden | H04L 63/0815 726/1 |
| 9,032,497 B2 | 5/2015 | Padala | |
| 9,100,709 B1 | 8/2015 | Osminer | |
| 9,398,339 B2 | 7/2016 | Lee | |
| 2002/0013948 A1 | 1/2002 | Aguayo et al. | |
| 2002/0174430 A1 | 11/2002 | Ellis et al. | |
| 2002/0184637 A1 | 12/2002 | Perlman | |
| 2003/0097564 A1 | 5/2003 | Tewari et al. | |

(Continued)

FOREIGN PATENT DOCUMENTS

| | | | | |
|---|---|---|---|---|
| EP | 2003838 A1 | * | 12/2008 | ............. H04L 63/08 |
| EP | 2003838 A1 | * | 12/2008 | ............. H04L 63/08 |

*Primary Examiner* — Ashokkumar B Patel
*Assistant Examiner* — William B Jones
(74) *Attorney, Agent, or Firm* — Eversheds Sutherland (US) LLP

(57) ABSTRACT

Aspects of the disclosure relates to managed access to content and/or services. In certain aspects, tokens or other artifacts can be utilized for authentication and authorization.

19 Claims, 26 Drawing Sheets

(56) References Cited

U.S. PATENT DOCUMENTS

| | | |
|---|---|---|
| 2003/0182429 A1 | 9/2003 | Jagels |
| 2003/0208763 A1 | 11/2003 | McElhatten et al. |
| 2004/0162787 A1 | 8/2004 | Madison et al. |
| 2005/0005114 A1 | 1/2005 | Medvinsky |
| 2005/0022242 A1 | 1/2005 | Rosetti et al. |
| 2005/0183120 A1 | 8/2005 | Jain et al. |
| 2006/0005254 A1 | 1/2006 | Ross |
| 2006/0080703 A1 | 4/2006 | Compton |
| 2006/0085821 A9 | 4/2006 | Simmons et al. |
| 2006/0203001 A1 | 9/2006 | Van Der Stok |
| 2007/0091359 A1 | 4/2007 | Suzuki et al. |
| 2007/0104456 A1 | 5/2007 | Craner |
| 2007/0124781 A1 | 5/2007 | Casey et al. |
| 2007/0199039 A1 | 8/2007 | Diroo et al. |
| 2007/0226767 A1 | 9/2007 | Kaminski et al. |
| 2007/0250920 A1 | 10/2007 | Lindsay |
| 2008/0022331 A1 | 1/2008 | Barrett |
| 2008/0031276 A1* | 2/2008 | Hsu .................... H04M 11/062 370/468 |
| 2008/0077942 A1 | 3/2008 | MacMillan et al. |
| 2008/0086569 A1 | 4/2008 | Arora |
| 2008/0250101 A1 | 10/2008 | Tanaka |
| 2008/0306871 A1 | 12/2008 | Grannan |
| 2009/0119716 A1 | 5/2009 | Ellis |
| 2009/0144765 A1 | 6/2009 | Branam |
| 2009/0169179 A1 | 7/2009 | Johnson |
| 2009/0217326 A1 | 8/2009 | Hasek |
| 2009/0222853 A1 | 9/2009 | White et al. |
| 2009/0300673 A1 | 12/2009 | Bachet |
| 2010/0017828 A1 | 1/2010 | Xiong |
| 2010/0086277 A1 | 4/2010 | Craner |
| 2010/0100924 A1 | 4/2010 | Hinton |
| 2010/0162367 A1 | 6/2010 | LaJoie et al. |
| 2010/0250773 A1 | 9/2010 | Mao |
| 2010/0313257 A1 | 12/2010 | Padinjareveetil |
| 2010/0319044 A1 | 12/2010 | Agans et al. |
| 2011/0016014 A1 | 1/2011 | Tonnison et al. |
| 2011/0016307 A1 | 1/2011 | Killian |
| 2011/0052157 A1 | 3/2011 | Pickelsimer et al. |
| 2011/0110334 A1 | 5/2011 | Hirano et al. |
| 2011/0131619 A1 | 6/2011 | Hasek et al. |
| 2011/0143654 A1 | 6/2011 | Mukjhija |
| 2011/0154454 A1 | 6/2011 | Frelechoux |
| 2011/0247084 A1 | 10/2011 | Kolbert et al. |
| 2011/0249658 A1 | 10/2011 | Wohlert et al. |
| 2011/0276993 A1 | 11/2011 | Ferguson |
| 2011/0307548 A1 | 12/2011 | Fisk |
| 2011/0321100 A1 | 12/2011 | Toflghbakhsh |
| 2012/0008912 A1 | 1/2012 | Stevens |
| 2012/0030721 A1 | 2/2012 | Smith et al. |
| 2012/0131629 A1 | 5/2012 | Shrum |
| 2012/0151220 A1 | 6/2012 | Grecia |
| 2012/0159146 A1 | 6/2012 | Kamieniecki et al. |
| 2012/0180082 A1 | 7/2012 | Rothschild et al. |
| 2012/0210382 A1 | 8/2012 | Walker et al. |
| 2012/0254456 A1 | 10/2012 | Visharam |
| 2012/0275597 A1 | 11/2012 | Knox et al. |
| 2012/0284802 A1 | 11/2012 | Hierro et al. |
| 2012/0291104 A1 | 11/2012 | Hasek |
| 2012/0315021 A1 | 12/2012 | Schwesinger et al. |
| 2013/0007240 A1 | 1/2013 | Qiu et al. |
| 2013/0046849 A1 | 2/2013 | Wolf |
| 2013/0114940 A1 | 5/2013 | Merzon et al. |
| 2013/0145410 A1 | 6/2013 | Major et al. |
| 2013/0191884 A1 | 7/2013 | Leicher |
| 2013/0227615 A1 | 8/2013 | Bryant et al. |
| 2013/0254308 A1 | 9/2013 | Rose et al. |
| 2013/0269020 A1 | 10/2013 | Griffin et al. |
| 2013/0275545 A1 | 10/2013 | Baptist et al. |
| 2013/0304854 A1 | 11/2013 | Mao et al. |
| 2013/0315567 A1 | 11/2013 | Narayanan et al. |
| 2013/0326572 A1 | 12/2013 | Pitts |
| 2014/0020021 A1 | 1/2014 | Liu |
| 2014/0037270 A1 | 2/2014 | Graner |
| 2014/0040660 A1 | 2/2014 | Gladwin et al. |
| 2014/0082679 A1 | 3/2014 | Chan et al. |
| 2014/0089995 A1 | 3/2014 | Hasek |
| 2014/0101708 A1* | 4/2014 | Bradley ............. H04N 21/4122 725/95 |
| 2014/0115724 A1 | 4/2014 | van Brandenburg et al. |
| 2014/0165209 A1 | 6/2014 | Yin |
| 2014/0181519 A1 | 6/2014 | Rao |
| 2014/0189761 A1 | 7/2014 | Sood et al. |
| 2014/0215018 A1 | 7/2014 | Lam |
| 2014/0219638 A1 | 8/2014 | Viveganandhan et al. |
| 2014/0237505 A1 | 8/2014 | Rothschild et al. |
| 2014/0237520 A1 | 8/2014 | Rothschild et al. |
| 2014/0237521 A1 | 8/2014 | Rothschild et al. |
| 2014/0237522 A1 | 8/2014 | Rothschild et al. |
| 2014/0237525 A1 | 8/2014 | Rothschild et al. |
| 2014/0250471 A1 | 9/2014 | Guerra |
| 2014/0282982 A1 | 9/2014 | Rothschild et al. |
| 2014/0283120 A1 | 9/2014 | Mao et al. |
| 2014/0298441 A1* | 10/2014 | Yamaguchi ......... H04L 63/0815 726/8 |
| 2014/0325221 A1 | 10/2014 | Rothschild et al. |
| 2015/0009991 A1 | 1/2015 | Sung et al. |
| 2015/0012995 A1* | 1/2015 | Korat .................... H04W 12/06 726/8 |

* cited by examiner

FEDERATED SERVICES MANAGED ACCESS TO SERVICES AND CONTENT

CROSS-REFERENCE TO RELATED APPLICATIONS

This application claims the benefit of U.S. Provisional Patent Application No. 61/802,207, filed on Mar. 15, 2013, which is hereby incorporated herein by reference. This application also is related to U.S. Patent Application No. (not yet assigned), filed on Mar. 18, 2014, and entitled "MANAGED ACCESS TO CONTENT AND SERVICES;" and U.S. Patent Application No. (not yet assigned), filed on Mar. 18, 2014, and entitled "NETWORK TOKEN AUTHENTICATION SCHEME;" the entirety of each of the above-captioned applications is incorporated herein by reference.

BRIEF DESCRIPTION OF THE DRAWINGS

The accompanying drawings and appendices are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
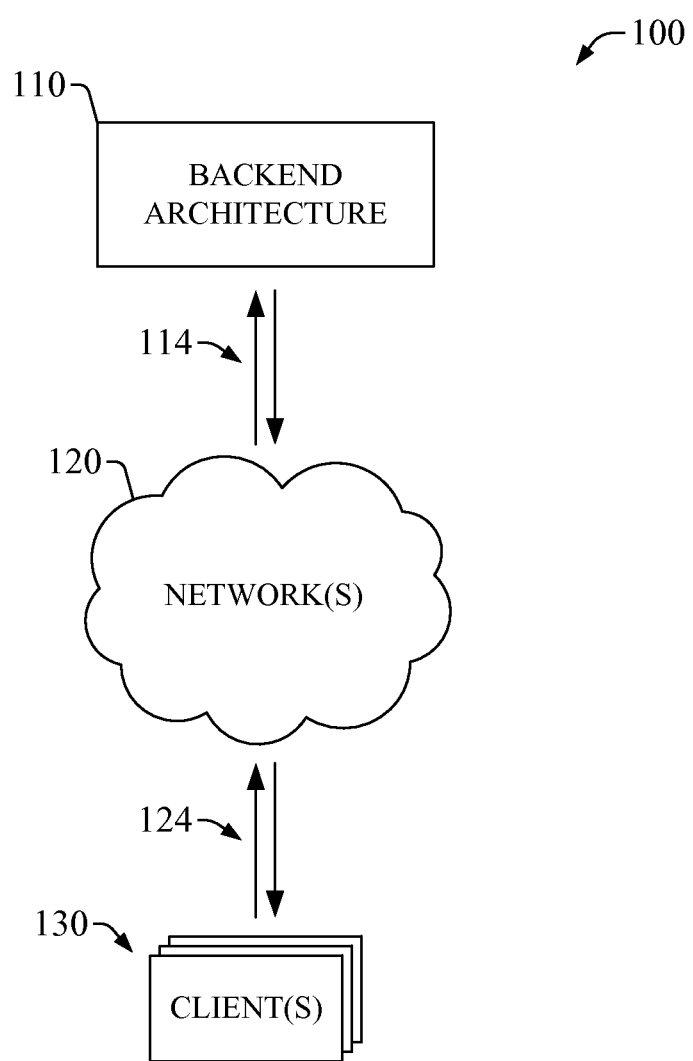
FIGS. 1-6 present example operational environments in accordance with one or more aspects of the disclosure. The operational environments represent various token and trust domains in accordance with aspects of the disclosure.

The disclosure recognizes and addresses, in one aspect, the issue of access to service and protection of content. The disclosure permits management of access to service and content via a plurality of tokens that ensure access integrity, including mitigation of avoidance of attacks, such as denial of service (DoS). At least one token of the plurality of tokens can be issued by a network platform and can be validated by another network platform prior to issuing another token of the plurality of tokens. Several issuance and validation stages can form a chain of access trust that can permit adequate—e.g., authorized or entitled—access to service and/or content. The network platforms that issue and/or validated a token can form one or more trust domains that can be assembled (e.g., logically assembled and/or physically assembled) to manage access to specific services and related content. It should be appreciated that, in one aspect, authorization and entitlement are distinct. For example, service authorization relates to permitted access to a service that can provide specific assets, whereas content entitlement relates to a group of one or more actions that can be applied to an asset. Accordingly, in the disclosure, consumption of an asset (e.g., playback of a video-on-demand (VOD) asset) associated with a service can be effected in response to (1) a validation of a service token associated with the service that provides the asset and (2) validation of a content entitlement token that is indicative or otherwise representative of scope of consumption that is permitted in connection with the asset. In certain embodiments, for certain validated content entitlement, an asset (a VOD asset, an nDVR asset, an audio stream, a video stream, or the like) can be protected via encryption or other rights-management technology (DRM technology, such as rights locker) that permit validation of a client device (e.g., user equipment or customer premises equipment). Thus, it is readily apparent that trust domains permit extensibility of such management (e.g., services and/or content or content sources can be added or removed from an initial configuration) without substantive network reconfiguration (e.g., redeployment). In addition, one or more tokens permit protection of the content. Accordingly, via a group of tokens, the disclosure permits seamless access and protection to content. It should be appreciated that, in one aspect, tokenized management of access to content and services permits rich management capabilities without substantive modification to network architecture. In another aspect, such tokenized management permits service extensibility without significant modification to network operation.

The disclosure provides various advantages with respect to conventional technologies for access to a service and/or content in an environment comprising networked devices. As an example advantage, the disclosure can permit ease of implementation of new services without substantive modification to network architecture or access mechanism to such services. As another example advantage, the disclosure can provide improved efficiency of content delivery, and increased adaptability to content type. As yet another example, the disclosure can provide flexibility of content protection and access to service with respect to source of content and/or service and consumer (e.g., end-user, user equipment, customer premises equipment, combinations thereof, and the like).

Glosssary.—At least the following acronyms are utilized in the present specification and annexed drawings:
BO: Back office;
BSS: Business Support Systems;
CA: Conditional Access;
CAS: Conditional Access System;
CDN: Content Delivery Network;
COTS: Commercial Off the Shelf;
CVM: Middleware;
DRM: Digital Rights Manager;
DVR: Digital Video Recorder;
ESB: Enterprise Service Bus;
HD: High Definition;
HDMI: High-Definition Multimedia Interface;
HFC: Hybrid Fiber-Coaxial;
IP: Internet Protocol;
nDVR: network DVR;

OSS: Operating Support Systems or Operations Support Systems;
QAM: Quadrature Amplitude Modulation;
SOA: Service-Oriented Architecture;
SDP: Service Delivery Platform;
SP: Service Provider;
SSO: Single Sign-On;
STB: Set-top Box;
VM: Virtual Machine; and
VOD: Video On Demand.

Other acronyms may be utilized in the present specification (which incorporates the Appendices) and drawings despite not being included in the foregoing listing. Such acronyms are widely adopted in the art and thus, a person having ordinary skill in the art would readily understand their meaning As an illustration, FIG. 1 presents a high-level block diagram of an operational environment 100 of the disclosure in accordance with one or more aspects of the disclosure. As illustrated, the operational environment comprises a backend architecture 110 (e.g., platforms, network nodes and/or components, data and signaling pipes, and the like) that can provide various services to one or more client component(s) 130 (referred to as client(s) 130. The client(s) 130 can comprise hardware, software, and combinations of hardware and software (e.g., firmware clients). In certain embodiments, the client component(s) 130 can comprise one or more client devices having various degrees of computational functionality (e.g., a processing power or capability, storage capability, and the like) and computational resources (e.g., processor(s), one or more memories or memory devices, bus(es), combination thereof, or the like). In the operational environment 100, the client(s) 130 can communicate with one or more functional elements of the backend architecture 110 via one or more network(s) 120. To at least such end, at least one of the client(s) 130 can be functionally coupled to the network(s) 120 via one or more data and signaling pipes 124, and the one or more functional elements of the backend architecture 110 can be functionally coupled to the network(s) 120 via one or more data and signaling pipes 114. Both the data and signaling pipes 124 and the data and signaling pipes 114 can include wireline links and/or wireless links. Such links can include reference links having one or more network nodes (e.g., routers, gateway, servers, and the like) and one or more links (wireless and/or wireline). The network(s) 120 can include communication network(s), content distribution network(s), utility network(s), combinations thereof, or the like. The network(s) 120 can operate in accordance with one or more protocols for wireless and/or wired information (data, metadata, and/or signaling) communication.

The services provided by the backend architecture 110 can comprise services for authentication and/or authorization of a client (e.g., a client component or a client device); services for generation of assets and management of assets; and services for communication of assets, such as multimedia assets.

A service for management of an asset (e.g., a multimedia asset, such as a video segment, an audio segment, a video stream, an audio stream, etc.) can include a service for generation of a token. The token can be embodied in or can comprise an information object (such as a data structure) with a certain information payload. The token, or the information payload, can be valid for a predetermined period, which can range from about a few minutes to about tens or hundreds of hours. The predetermined period can be referred to as the "token lifetime". In addition, the token can be operated upon by one or more functional elements (e.g., a platform having a server) of the backend architecture and/or a client of the client(s) 130. For example, a platform or a client can decode, decrypt, encode, encrypted, transform (e.g., augment or reduce information payload), and/or otherwise process the token. The token and the associated information payload can be specific to a platform (e.g., a group of network nodes) that generates the token. The payload information in a token can be validated or negated, which can be referred to as validating or negating the token.

As described herein, validation of a token can cause generation of a second token that can permit access to a service, an asset, or information for management or processing (e.g., consumption) of an asset. Validation of the second token can permit further access to another service, another asset, or other information for management or processing of other assets. In certain embodiments, a collection of validation-issuance of tokens can terminate in delivery of an asset for consumption to a client component (see, e.g., FIGS. 1-6). As described herein, such collection can form what is referred as a chain of trust, in which a plurality of validated tokens can permit access to a specific asset under predetermined conditions.

Figure 2:
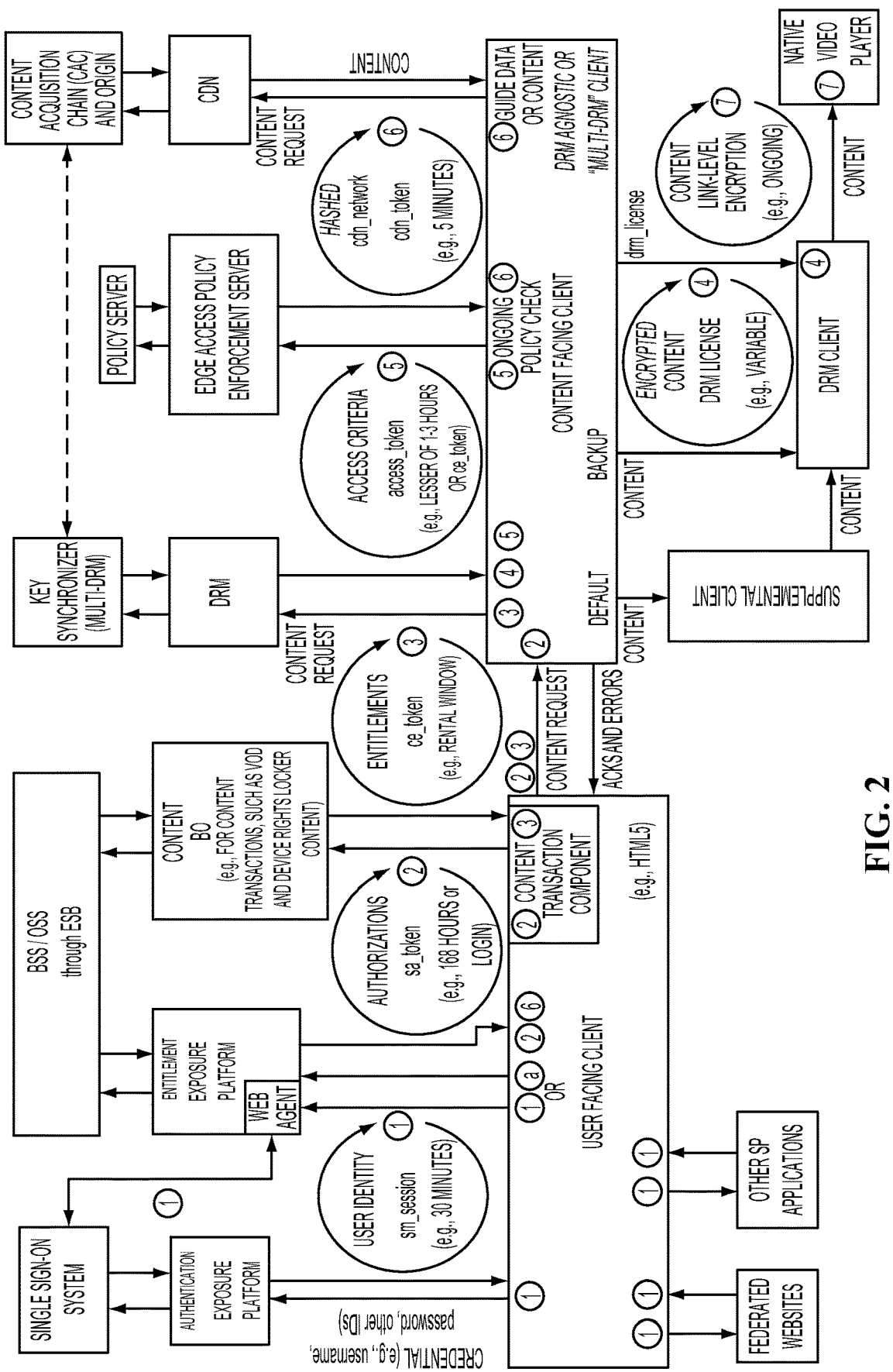
Figure 3:
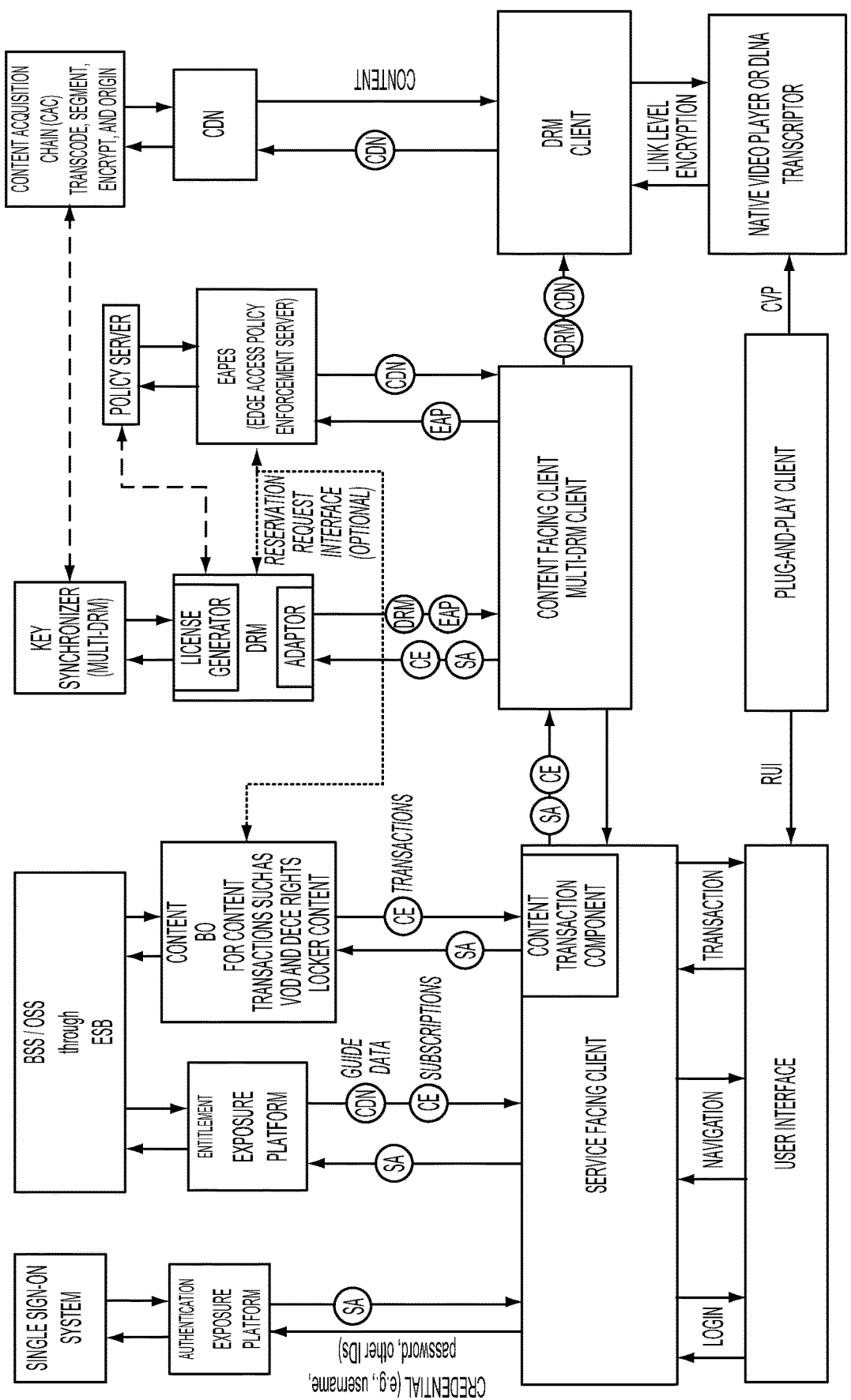

In certain embodiments, the backend architecture 110 can comprise a plurality of platforms that can provide one or more services, including generation of tokens, delivery of assets and information for asset management (e.g., DRM licenses, or the like). For example, the plurality of platform can include one or more of a service access management platform, which can include a single sign-on system, an authentication component (e.g., a middleware component), an entitlement component (e.g., a middleware component), and a BSS/OSS, as shown in FIGS. 2 and 3.

In the disclosure, as illustrated in at least FIGS. 1-6 and 8, a client device or a client component can receive and communicate a token to a platform in the backend architecture 110.

As described herein, the disclosure permits access to content without coexistence of CAS and DRM. It should be appreciated that CAS can protect the service, whereas DRM can protect the content from fraudulent access at a client device. Both CAS and DRM can utilized or otherwise leverage encryption as an underlying technology to ensure that specific policies respectively associated with the CAS and the DRM can be enforced. It should be appreciated that encryption is also used to protect privacy and to ensure data fidelity/validity (source). As described herein, encryption can be utilized at the link-layer (see, e.g., FIG. 1) or at the data-layer. In embodiments with separate CAS and DRM, such as the operational environment shown at FIG. 1, the DRM system or a platform comprising the DRM can permit encryption/decryption. Yet, a DRM client (e.g., one of client(s) 130) need not enforce policies nor should be able to enable content unless the CAS has "signed" (e.g., issued or otherwise generated) a suitable token that can include service-level information. The service-level information may contain information relevant to DRM. Yet, such information also may be originated and/or accessed from an external source (e.g., a static reference, a rights locker, and combination thereof, and so forth).

The CAS system can be responsible for coordinating identity. The DRM system can be agnostic of identity, but can utilize identity information provided to the DRM by or otherwise received at the DRM from the CAS to engage one or more external sources of rights information (e.g., a rights locker). The DRM system can be responsible for validating a client and ensuring the ability to secure content protection.

The CAS can be agnostic of the device (in this paradigm, e.g., when DRM is involved).

In certain embodiments, tokenized validation can be implemented in network elements other than CAS. Such network elements can comprise, for example, one or more of networks, network components, platforms, systems, and the like, and can permit access to network resources that can provide or facilitate content. For instance, a CDN can utilize or otherwise leverage a CDN token (see, e.g., FIGS. 1, 2, 5, 6, 9, and 12). In one aspect, the CDN token can prevent, at least in part, attacks on the CDN resource independently from CAS and/or DRM, and can be implemented after one or more of CAS policies or DRM policies have been evaluated or otherwise effected. In certain scenarios, a trusted party (e.g., CAS and/or DRM) can indicate or otherwise convey to the CDN that the request originating from a client (e.g., a content facing client) is highly likely to be valid. In other scenarios, there may be CAS or DRM constraints that may be considered, such as a service level (e.g., guaranteed bitrate) that can limit the number of simultaneous streams (e.g., single program transport streams (SPTSs) or multi-program transport streams (MPTS), or combinations of the foregoing), or a content restriction that permits access (exclusively, for example) to one version of the stream at the same time. As an illustration, in a scenario in which a constraint rule is to be enforced by a delivery mechanism, such constraints or regulation can be embedded as part of the CAS and not the DRM. As another illustration, such constraints or regulation can be contained with the DRM and not the CAS in a scenario in which a constraint rule is to be enforced by a rights locker. In this scenario, the CAS can embody or can comprise the trusted party signaling to the CDN that there is a high likelihood that an end-user device and/or the associated end user can obtain the content. It should be appreciated that the DRM or DRM system can continue protecting the content—even if the end-user device and/or the associated user can be valid, a malicious user can "capture" network packets and perform an attack. Thus, CAS signaling to the CDN may be insufficient to provide content protection and therefore, in one aspect, may not be relied upon for content protection.

It should be appreciated that in one or more scenarios, such constraints can be implemented via a rights locker in view that such implementation can be propagated across multiple distribution points and Sync-and-Go. In one aspect, Sync-and-Go is a service that "blurs" the line. In certain embodiments, periodic refreshes may be applied to the Sync-and-Go service in order to ensure that and end-user device still should have access to a specific service independent from content protection rules.

In one example, VOD Rental Windows is a more clear "overlap" or hand-off. As an illustration, if an asset is rented for 24 hours, then service-access is secured where the manner in which the content can be used (e.g., duration) is specifically addressed; and this information needs to be provided to the DRM system from the CAS (e.g., the content can be viewed until a specific or predetermined time). In scenarios in which a service provider sells separate rights for content to be able to be streamed out an HDMI port versus out a HD component interface, such separation would need to be communicated. Yet, in a scenario in which delivery of content from such interfaces or ports is the same set of rights and a limitation based on content rights (e.g. require HDCP) is present, then this would be entirely DRM. The DRM information may be embedded in the content, but may be available externally (e.g., in rights locker component (or rights locker)) or may be "passed through" the CAS system.

In certain embodiments, the service access management platform can issue (e.g., generate, transmit, generate and transmit, etc.) an authentication token. In one aspect, the authentication token (e.g., sm_token in FIG. 2) can include information payload indicative of identity of an end-user associated with a client device for which the authentication token is issued. In addition, the service access management platform or a component therein can ascertain that the authentication token is valid. In response to ascertaining that the authentication token is valid, the service access management platform can issue a service authorization token (e.g., sa_token in FIG. 2).

A content management platform can ascertain that the service authorization token is valid. For example, the content management platform can comprise a content BO, as shown in FIG. 2. In one aspect, in response to ascertaining that the service authorization token is valid, the content management platform can supply (e.g., generate and transmit) to a device verification platform (e.g., a DRM server) a content request for a media asset and a device verification request for a device. The device verification request can be based at least in part on the content request for the media asset. In certain embodiments, the device can be a client device of the client(s) 130, and can comprise a user-facing client component (or user-facing client) and a content-facing client component (or content-facing client), as shown in FIG. 2.

The device verification platform can ascertain that the device is verified. In response to ascertaining that the device is verified, the device verification platform can issue a key (e.g., DRM license) at the device verification platform and to receiving the content request for the media asset. In one aspect, the key can comprise information suitable for processing (e.g., decrypting) content associated with a media asset.

In addition, the content management platform (e.g., content BO in FIG. 2) can issue an access token (e.g., access_token in FIG. 2) in response to ascertaining that the service authorization token is valid. In one aspect, the access token can be associated with the content request for the media asset.

A content access management platform can ascertain that the access token is valid for the content request for the media asset. The content access management platform can be embodied in or can comprise an edge access policy enforcement server (EAPS) and/or a policy server, as shown in FIG. 2. The content access management platform can ascertain that the access token is valid for the content request for the media asset and, in response, can issue a network access token (e.g., a cdn_token, as shown in FIG. 2). The content request and the network access token can be transmitted to a content distribution platform (e.g., a CDN, as shown in FIG. 2). The content distribution platform can ascertain that the network access token is valid for the content request for the media asset and, in response, the content distribution platform (e.g., the CDN) can supply (e.g., generate or otherwise acquire, transmit, a combination thereof, or the like) the media asset to the device.

The device can access the media asset (represented, for example, as "content" in FIG. 2) based at least in part on the key. To at least such end, in one aspect, the device can include a media processing client (e.g., a DRM client, as shown in FIG. 2) which can decrypt or otherwise access the content associated with the media asset based at least on the key (e.g., a DRM license). As illustrated in FIG. 2, the device can comprise or can be functionally coupled to a native video player that can receive decrypted content that is decrypted according at least in part to link-level encryption.

In another aspect, with reference to FIG. 2, at least a portion of the illustrated operational environment can be constitute the backend architecture 100 in FIG. 1. In one example, the exposure platform (which is shown as distributed) can receive identification information from a client device (also referred to as a client). The exposure platform can determine from the identification information an authentication service. In addition, the exposure platform, can communicate the identification information received from the client to the authentication service. The exposure platform can receive, from the authentication service, a session token representing the authenticated entity. It can be appreciated that a token is an example of an artifact, or information structure. In response, the exposure platform can communicate the session token representing the authenticated entity to the client. In addition, the exposure platform can receive, from the client, a request for authorizations and the session token representing the authenticated entity. The exposure platform can communicate, to the authentication service, the session token representing the authenticated entity. The exposure platform can receive, from the authentication service, a confirmation that the session token is valid. As described herein, the session token can include information such a period during which the token is valid, an interval after which a secret key or secret associated with the toke is to be replaced, and the like.

Continuing with reference to FIG. 2, the exposure platform also can determine the appropriate entitlement service based on the session token. In addition, the exposure platform can request and/or receive entitlement information from such an entitlement service. In one aspect, the exposure platform can encapsulate information from the session token and entitlements into a service authorization token. The exposure platform also can communicate the service authorization token to the client. A content management system, or a content transaction component can receive a service authorization token and can request for content from a client, such as the content facing client. In one aspect, the content management system, or a component thereof, can determine the content entitlement associated with the client that has been authenticated (e.g., the user facing client). In one aspect, the content management system, can encapsulate content entitlement(s) into a content entitlement token. The content management system can communicate the content entitlement token (e.g., CE token) to the content facing client.

Continuing with reference to FIG. 2, a digital rights management (DRM) adaptor component (which can embody or can constitute the illustrated DRM, for example; see also FIG. 3) can receive the content entitlement token and a request for a DRM license associated with the requested content. In one aspect, the DRM adaptor can validate or otherwise ensure that a DRM license generator (which can embody or can constitute the illustrated DRM, for example) has the appropriate one or more keys from the DRM Content Key Store (e.g., a key synchronizer). In one aspect, the DRM adaptor can request and receive a DRM license from the DRM License Generator for the requested content.

The DRM adaptor also can receive and request an access token (access_token) from an Edge Access Policy Enforcement Server (EAPES). In addition, the DRM adaptor can communicate the DRM License and access token to the content facing client. Further, the Edge Access Policy Enforcement Server can receive an access token and request for a CDN token (or network token) from the content facing client. As illustrated, the Edge Access Policy Enforcement Server can communicate the CDN token to such a client.

As illustrated, a content distribution network (CDN) can receive a request from content and a network token from the content facing client. In response, the CDN can communicate the requested content to the content facing client. In one example, at least a portion of such content can be forwarded to a native video player. In one aspect, the content can be according to or otherwise based on link-level encryption.

Figure 9:
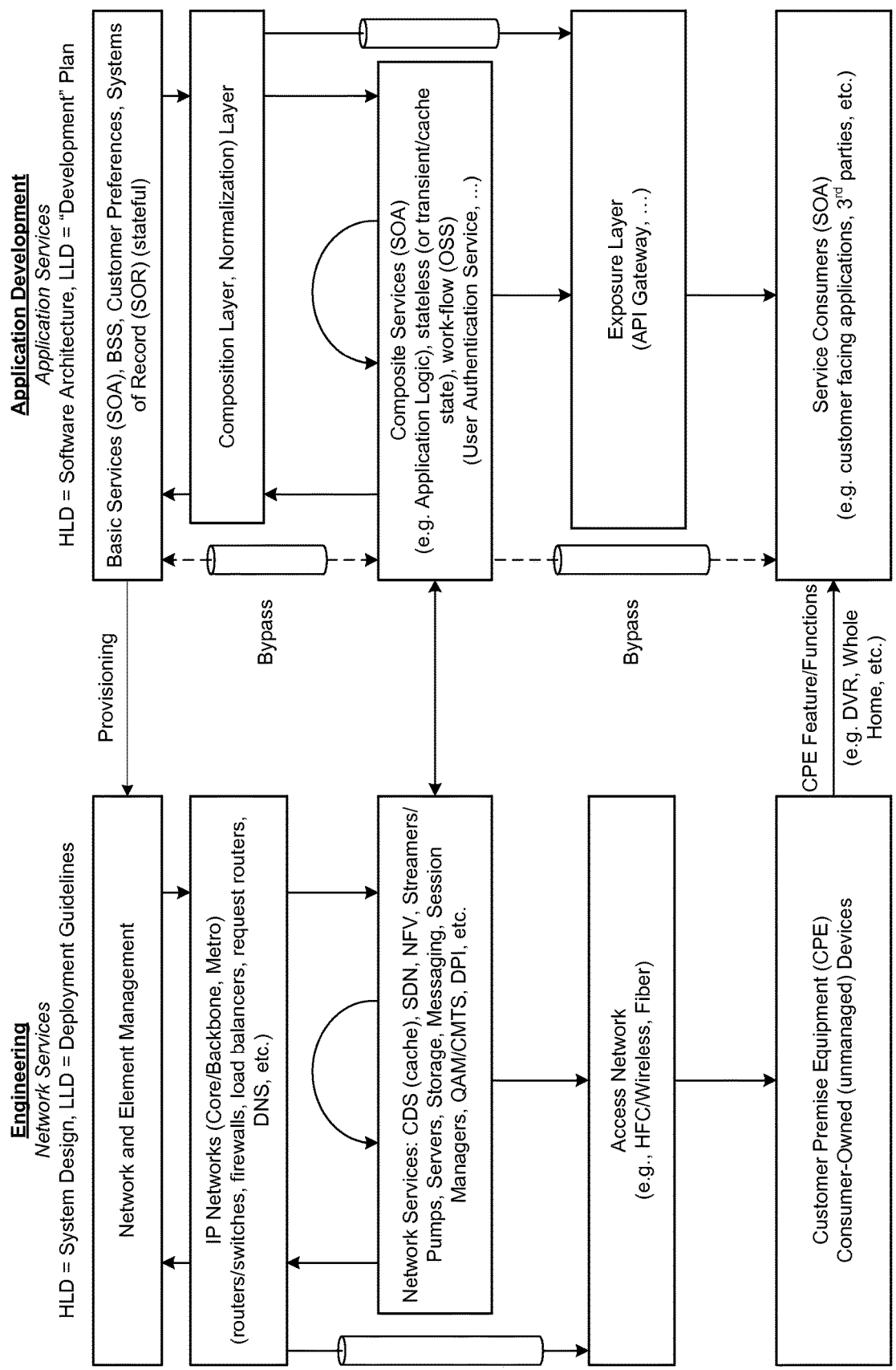
FIGS. 9-10 present examples of operation and/or developmental stages for implementation of manages access to content and/or services in accordance with one or more aspects of the disclosure.

It should be appreciated that in this disclosure an authenticated entity can be a client device or a user operating the client device. In addition, it should be appreciated that the exposure platform, the content management system, the DRM adaptor or DRM, the Edge Access Policy Enforcement Server, and the CDN can be contained within the backend architecture 110. In addition, as illustrated in FIG. 9, in certain embodiments, the backend architecture 100 can be segmented, where the functional element of the architecture and functionality of the architecture can be developed and/or can operated in two disparate domains (e.g., engineering and application development).

In other embodiments, e.g., the embodiment presented in FIG. 3, a user facing client can be embodied in a service facing client that can serve as a proxy to other client(s).

Figure 4:
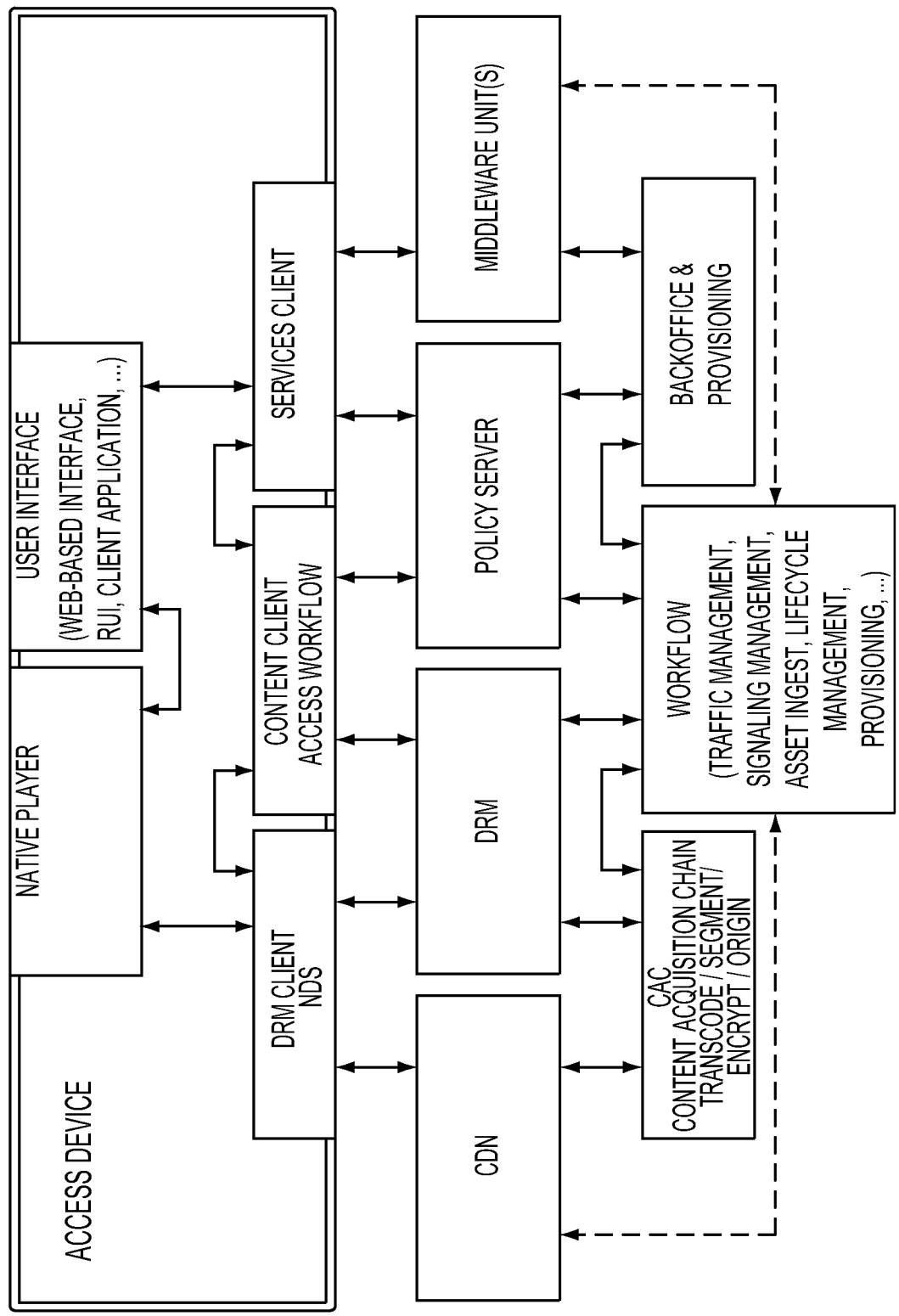

In another embodiment, e.g., the embodiment present in FIG. 4, the user facing client can include one or more clients and can be contained within an access device (e.g., a mobile computing device).

Figure 5:
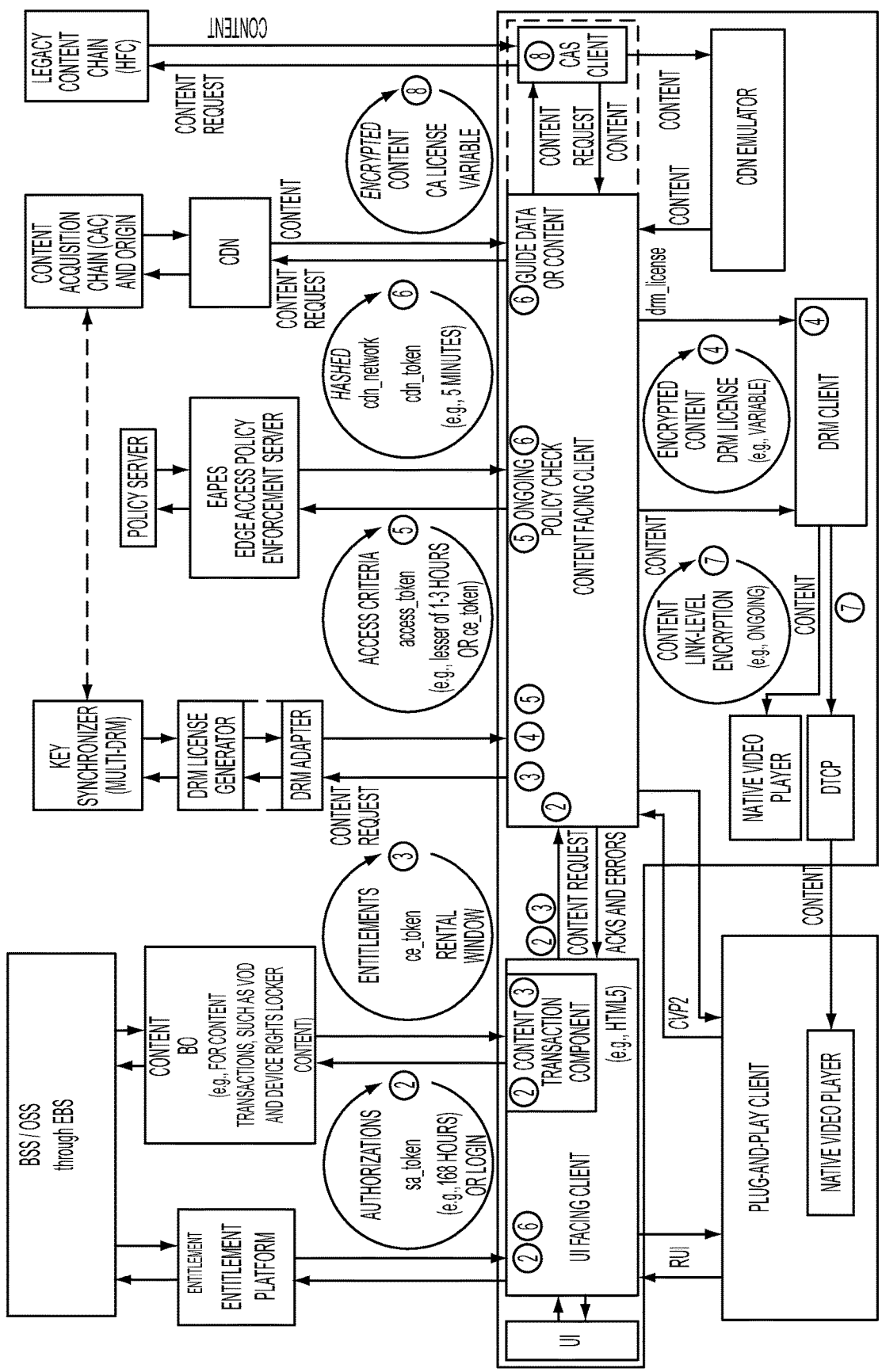

In yet another embodiment, e.g., the embodiment illustrated in FIG. 5, a gateway or other interface can embody or otherwise implement, at least in part, the user facing client and/or the content facing client. In one aspect, the gateway can support operation or can operate with remote clients.

Figure 6:
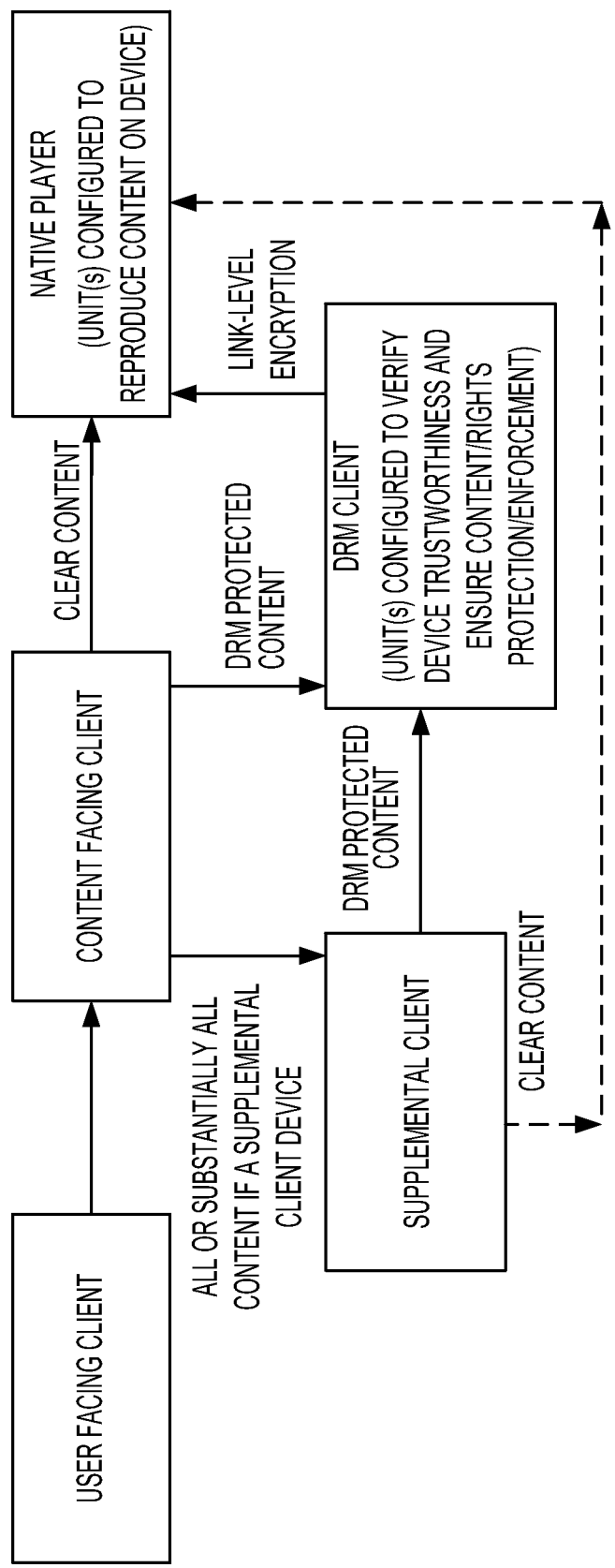
Figure 7:
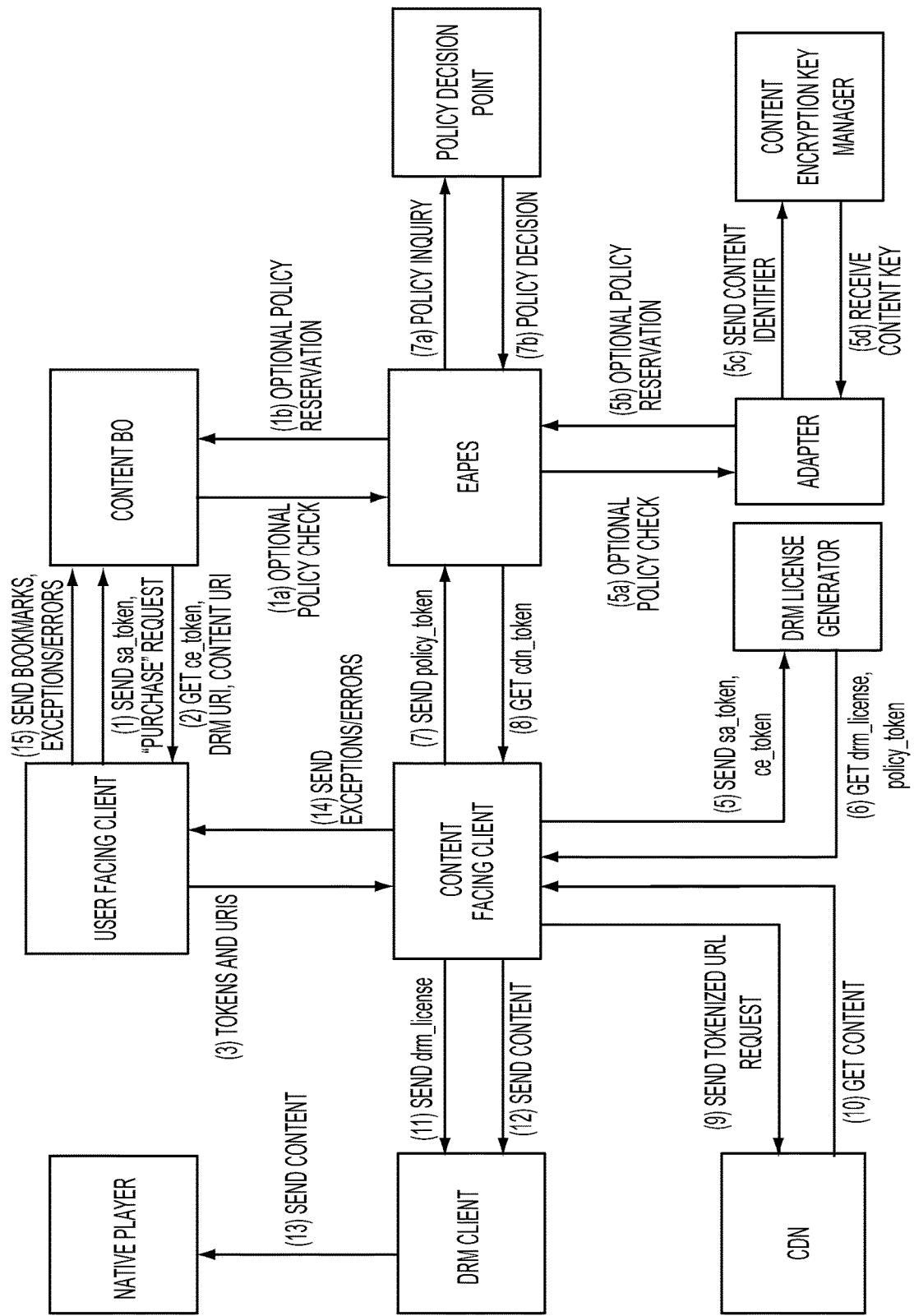
FIG. 7 illustrates information flow in an example of an operational environment in accordance with one or more aspects of the present disclosure.

FIG. 6 illustrates partitioning or an arrangement of various clients (which also may be referred to as client devices) and information (e.g., content) that can be exchanged among such clients. In addition, FIG. 7 present an example information flow between components or functional elements that form a system or platform that can permit managed access to content or service in accordance with aspects of the disclosure.

Figure 10:
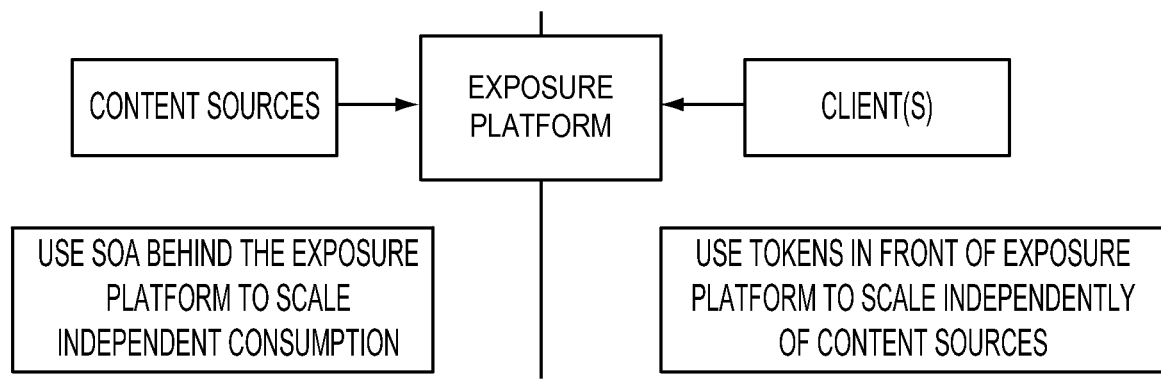
Figure 11A:
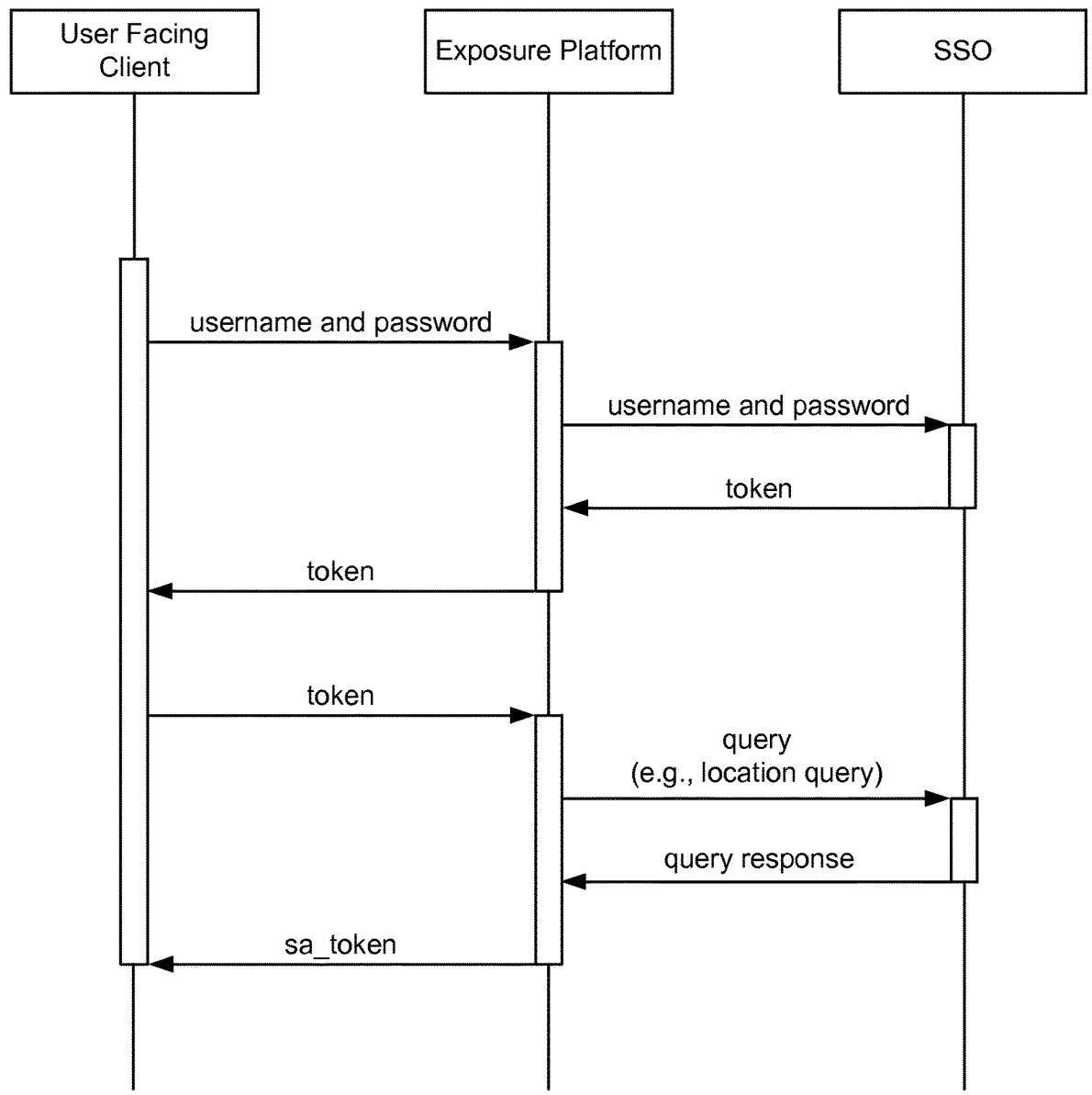
FIGS. 11-21 illustrate examples of methods in accordance with one or more aspects of the disclosure.
Figure 11B:
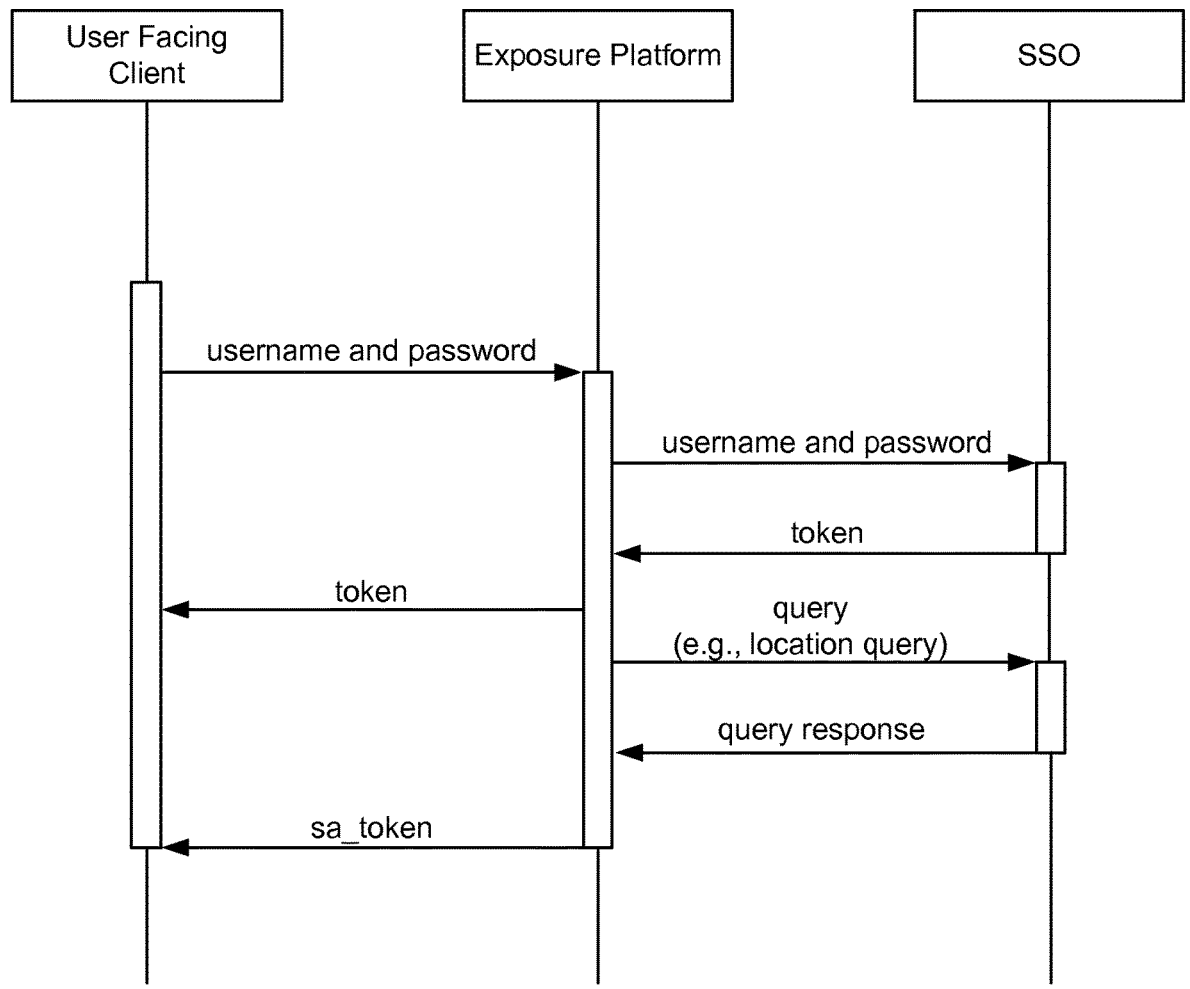
Figure 11C:
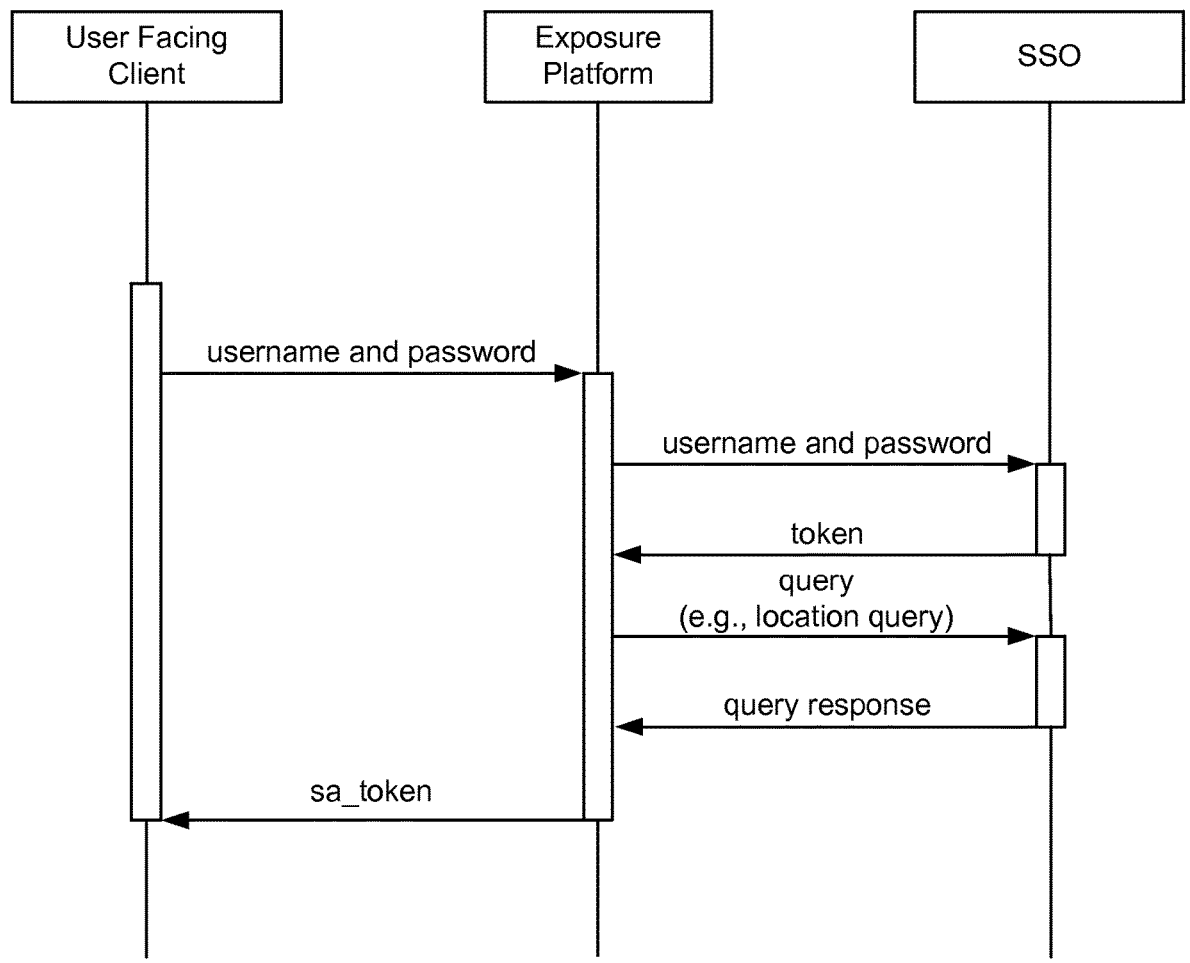
Figure 12:
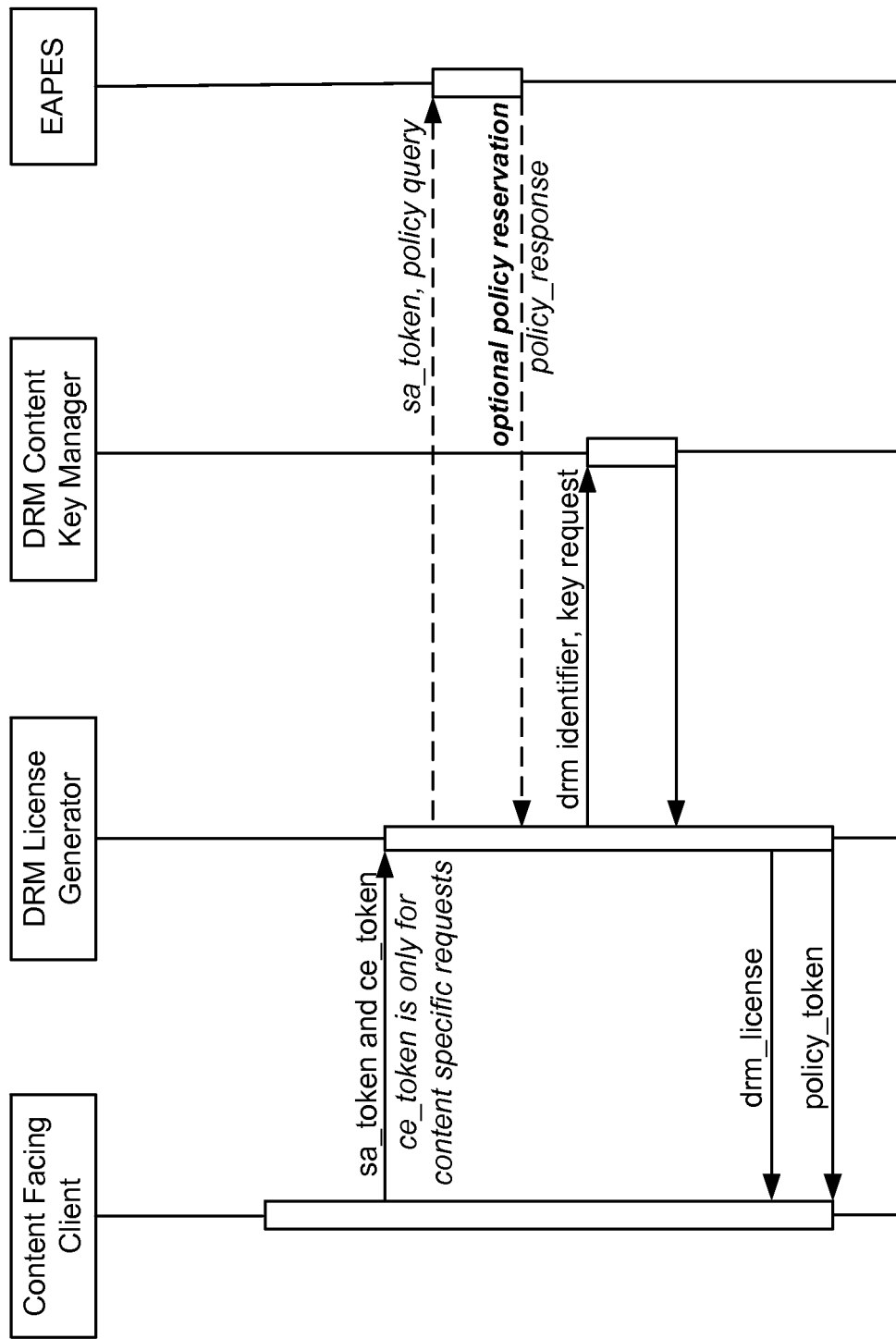
Figure 13:
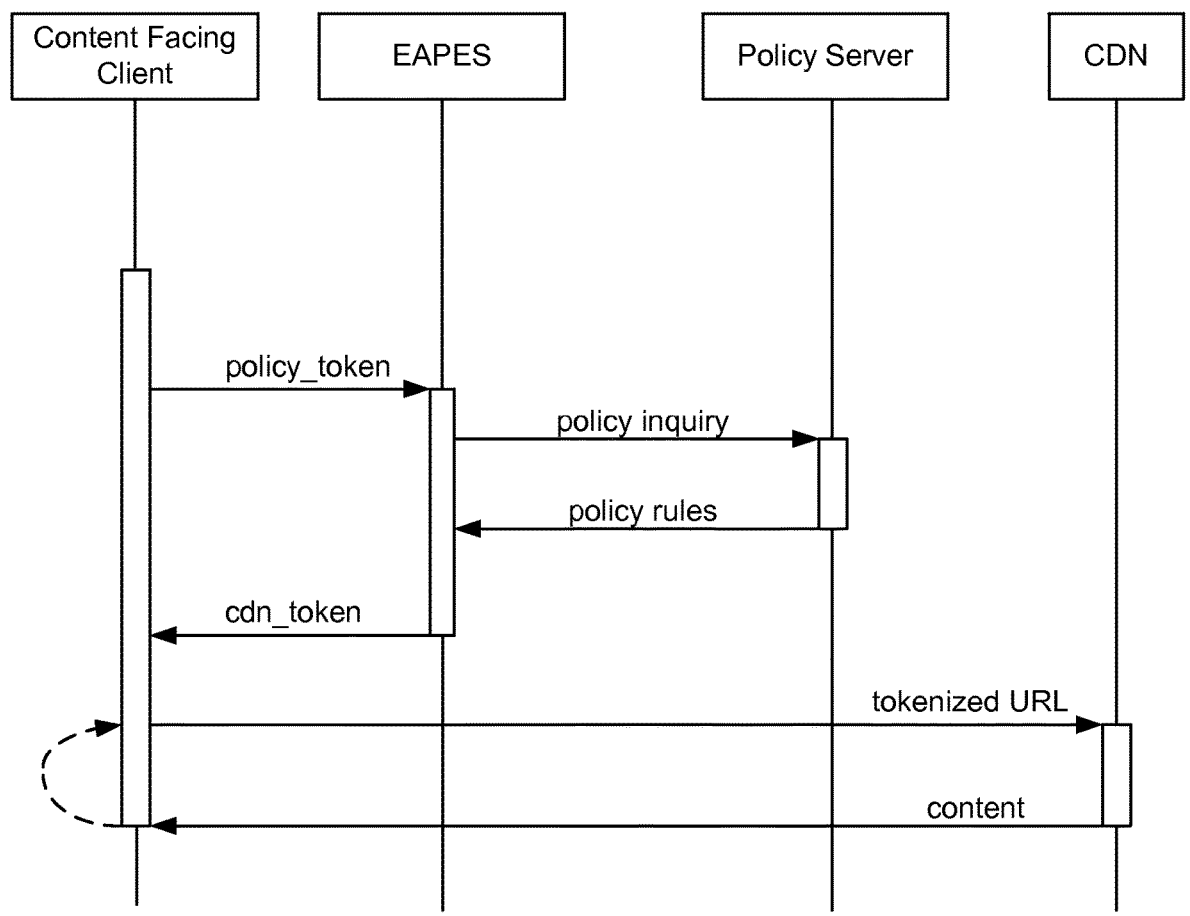
Figure 14:
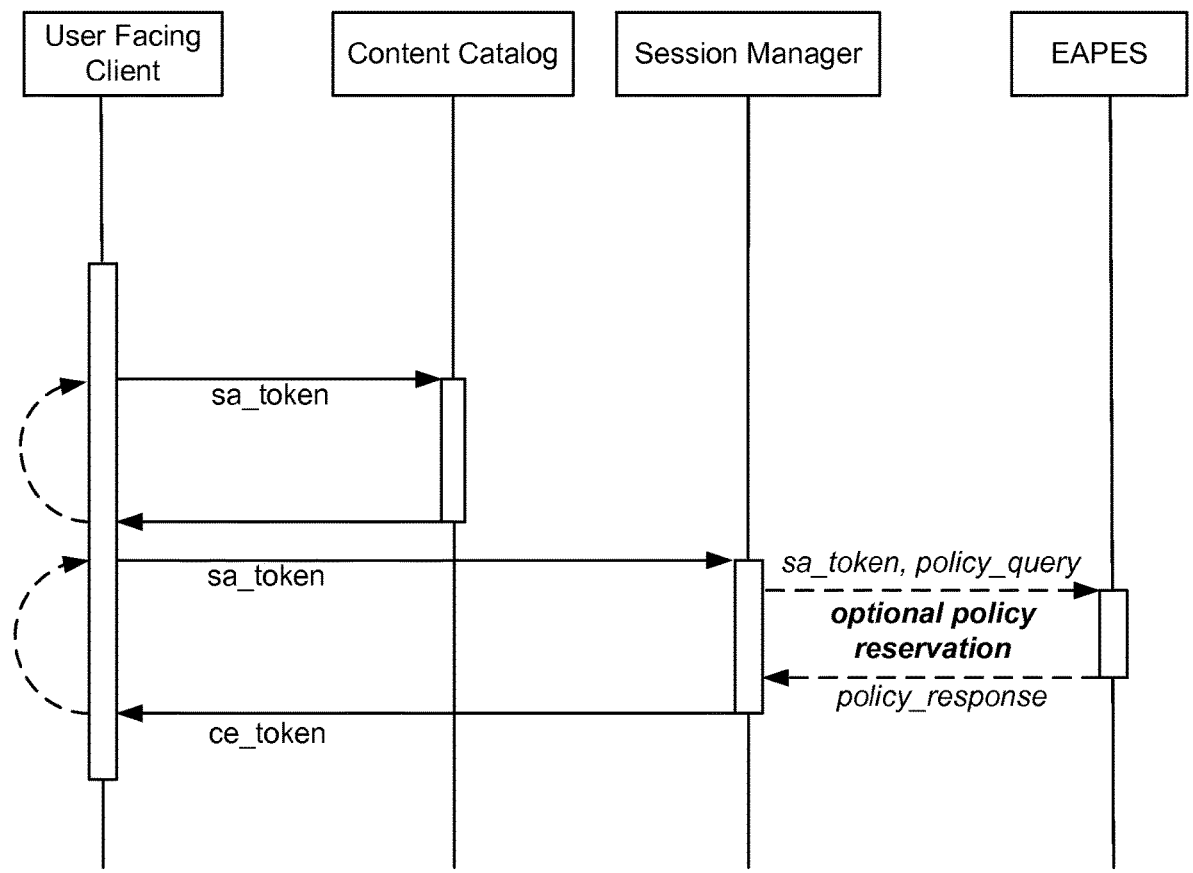
Figure 15:
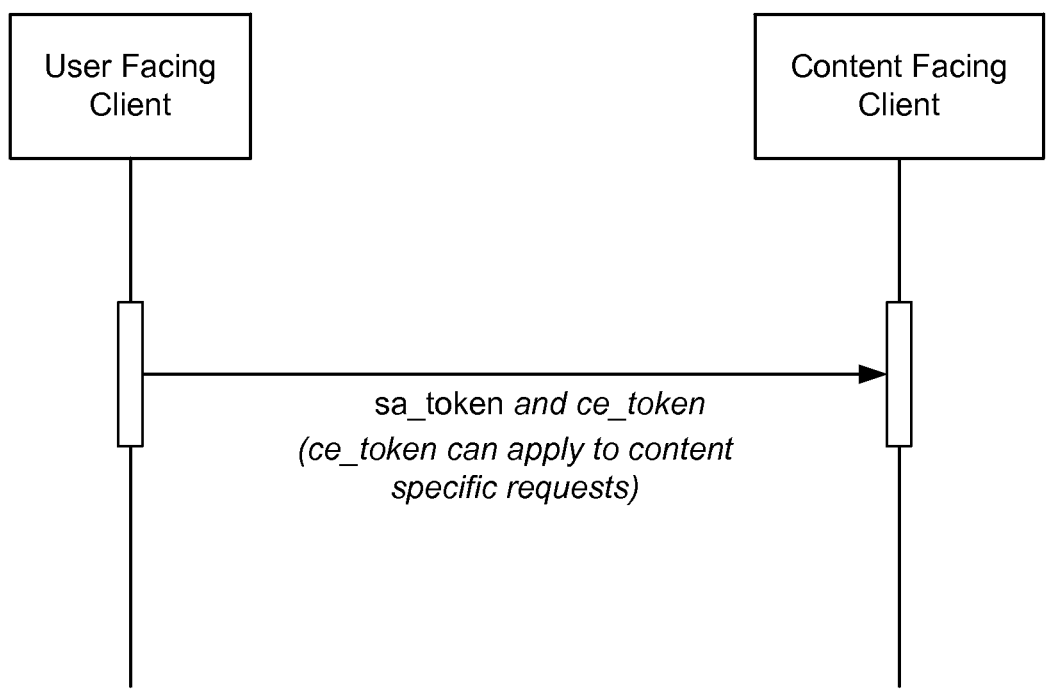
Figure 16:
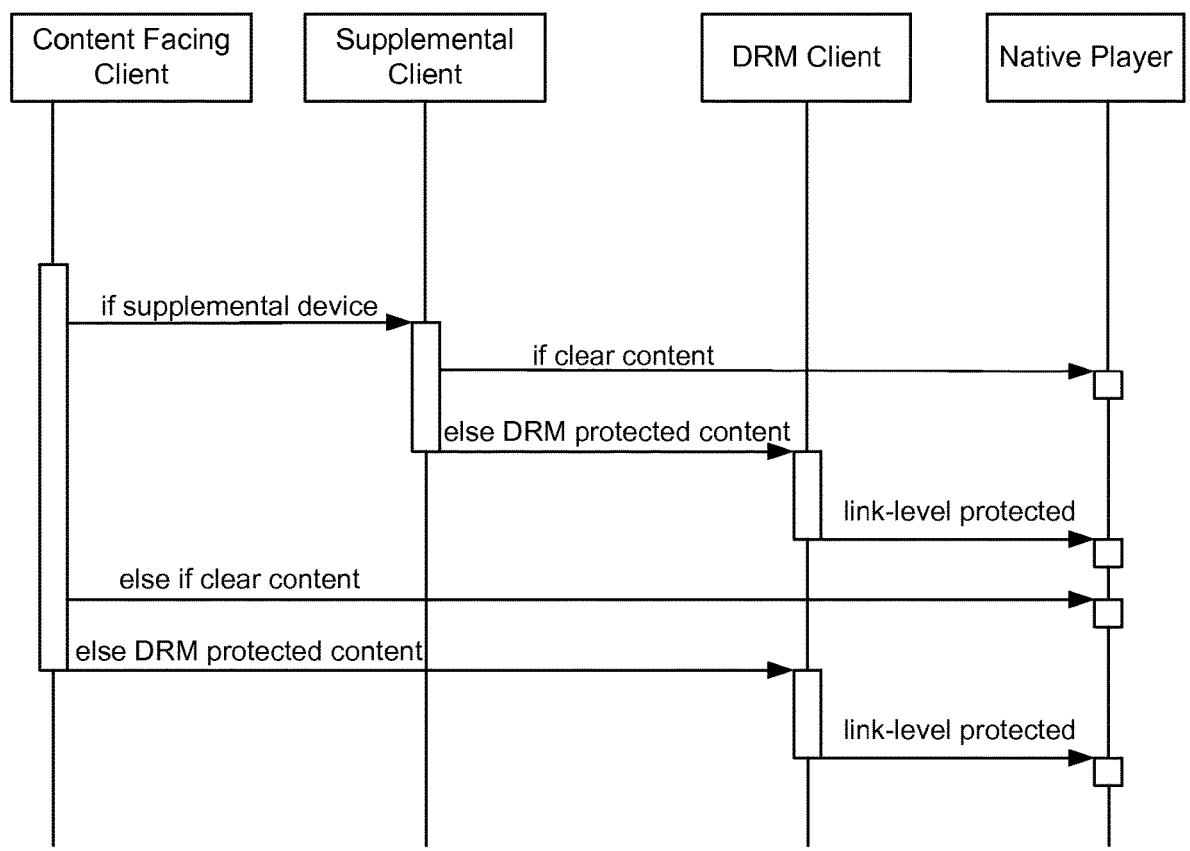

With reference to FIG. 10, it should be appreciated that the systems, platforms, and/or other apparatuses of this disclosure can be scaled by leveraging two development paradigms: (i) development of functionality via SOA behind an exposure platform, and (ii) utilization or otherwise reliance of tokens or other artifacts to scale the system independently of content sources.

Figure 8:
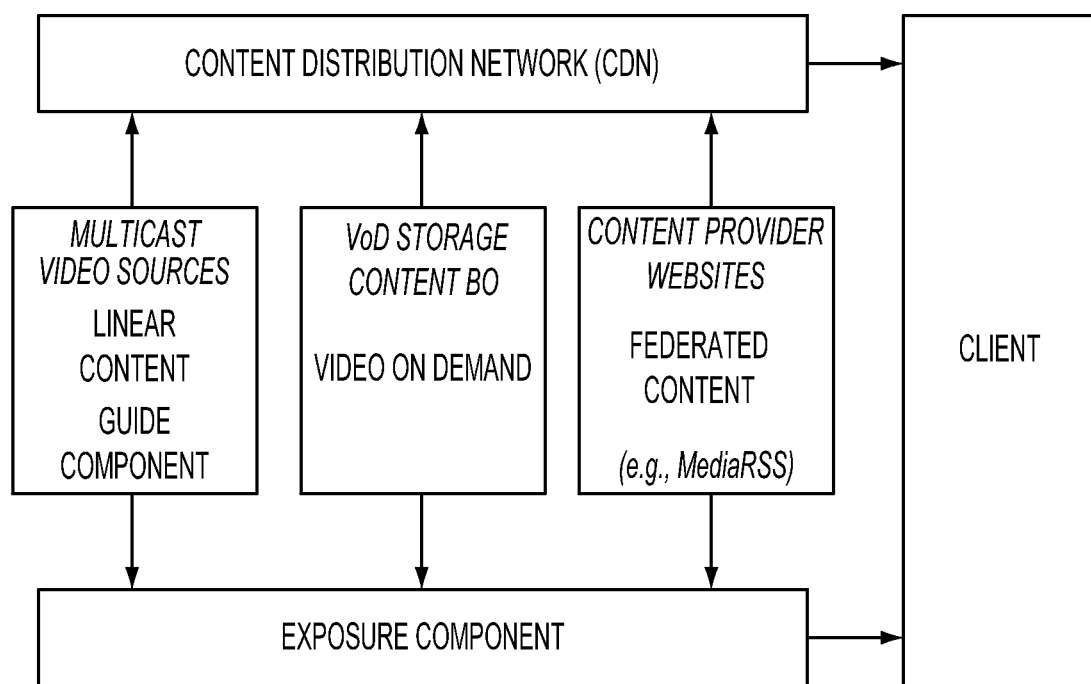
FIG. 8 presents an example operational environment in accordance with one or more aspects of the disclosure.
Figure 24:
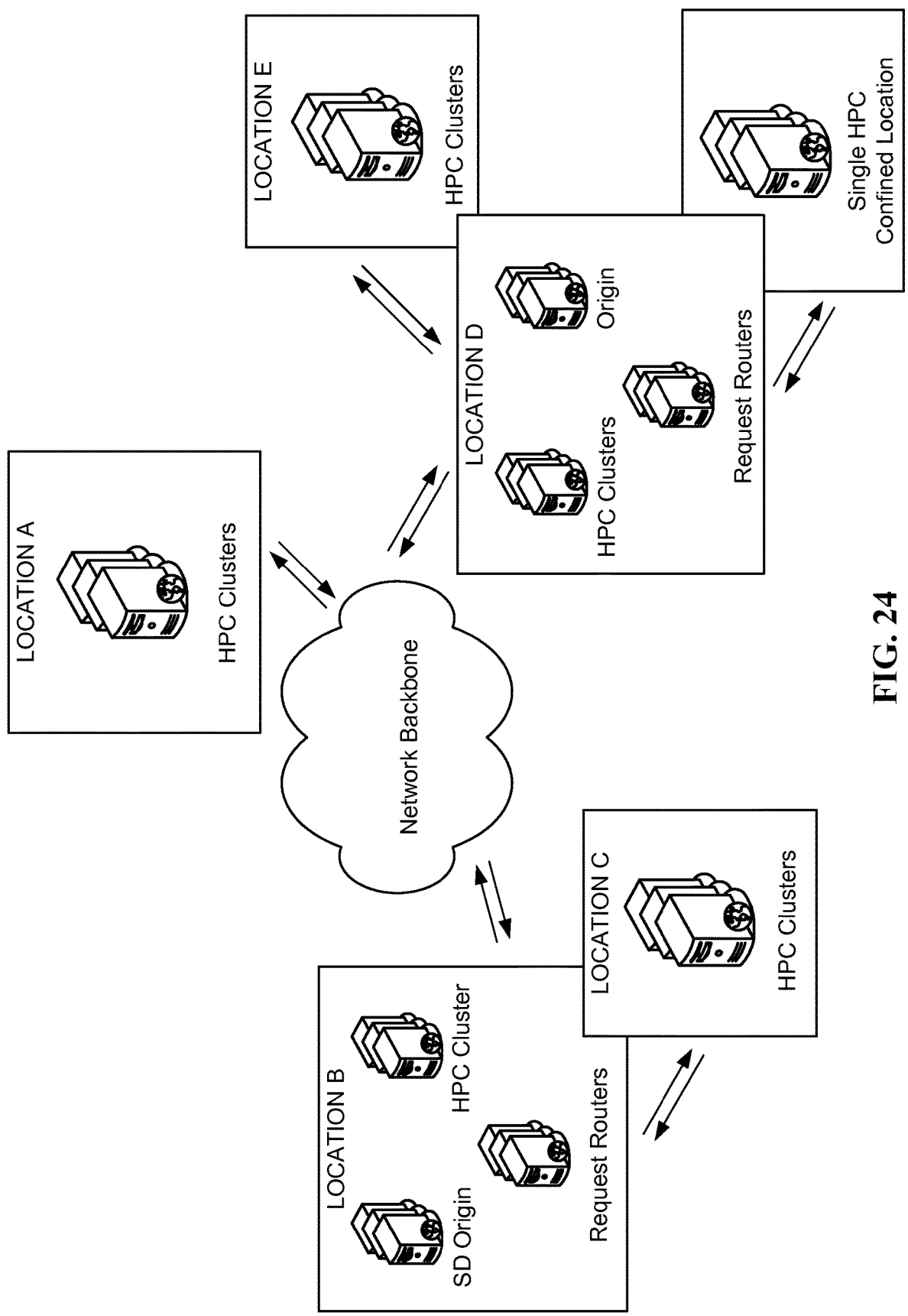
FIG. 24 illustrates an example of another operational environment in accordance with one or more aspects of the disclosure.

It certain embodiments, the disclosure permits loosely federated service management for video services over third party video access devices (e.g., STBs), e.g., video service enablement on network connected video devices limited to a specific sub region and subscribers footprint without exposing the service to other video device owners. FIG. 8 presents an example operational environment containing example systems that can permit managed access and/or content in accordance with the disclosure. FIG. 24 illustrates an example architecture of a content distribution network (CDN) in accordance with aspects of the disclosure, the illustrated CDN can serve content from various locations to a single confined location that may be associated with another location (e.g., Location D).

In certain embodiments, the disclosure contemplates that a service provider or MSO that provides video offering(s) and/or other multimedia offering(s) (such as games and music) can integrate such offering(s) into a third-party access device (e.g., COTS access device, such as a STB) which may be available for consumers in various retail and ecommerce locations. In such embodiments, the service provider or MSO can seamlessly authorize or otherwise configure such offering(s) or a service stemming therefrom in a manner that mitigates or avoids any type of end-user action for authentication and/or service access. The service can comprise a packaged plan including the third-party access device, high-speed Internet service, and/or a video/multimedia package. It should be appreciated that as the third-party access device can be available to parties that do not purchase the specific video/multimedia package, implementing management of access to such service in a manner that is controlled exclusively or nearly exclusively by the service provide or MOS, without end-user intervention, can permit confining access to subscribers of the service and mitigating access to non-subscriber. In addition, the management of access can permit regulation of access to the service based at least on location of the third-party access device. For instance, access can be denied to an end-user operating the third-party outside of a predetermined geographic area.

The disclosure can permit fulfilling such specifications (e.g., requirements) while using information available (either exclusively or non-exclusively) to the SP from the SP's data/communication network, such as IP or MAC address and specific subscriber data available from operating support systems of the SP. In certain embodiments, the disclosure provides methods that can be combined in order to provide sufficient authentication to enable service. In one example, referred to as identifier in-house check—the third party can report an identifier, e.g., an IP address, of an access device (e.g., an STB) and, in one embodiment, a network node of a service provider can match the identifier with its records to verify that an end-user associated with the access device is a subscriber of a service provided by the service provider and/or is located in a specification location (e.g., end-user dwelling). In another example, referred to as service code query (also referred to as code query), based at least on the identifier (e.g., the IP address), in one example embodiment of the disclosure, a network component of the service provider can check an OSS to see if a specific service code is assign to the subscriber that confirms the user is a valid offering subscriber In certain embodiments, a provider of the third-party access device (e.g., a STB provider) can supply (e.g., transmit or otherwise convey) two inputs to a provisioning and authentication service (PAWS):
1. An identifier (also referred to as a logic identifier), such as an IP address or a MAC address; and
2. A query for a service code indicative or otherwise representative of a specific service.

The service provider platform (e.g., an exposure platform, a back office component, combination thereof, or the like) can perform real-time check of that IP address and for the active occurrence of a service provider (SP) multimedia service code and respond back to the third party set-top box (STB) back office system. It will also respond back with the GUID of the primary account holder.
Input to PAWS:
1. Client's modem IP address
2. Flare service code query
Response from PAWS:.
1. Valid account or not based on IP check
2. Active service code on account or not
3. 13 digit account number In response to (e.g., upon or after) receiving true from PAWS, the third party back office (e.g., one or more network nodes) can configure, e.g., enable or otherwise authorize, a provider-specific features for assets (e.g., multimedia pack features) on the access device (e.g., the STB, such a client device or native video player in FIG. 4). It should be appreciated that, in one aspect, such configuration (e.g., enablement or authorization) can be automatic, without implementation of further logic specific to determination to service verification. An end-user or an associated end-user device (e.g., the STB) that fail the foregoing test can receive a different and/or limited user interface that may not include the provider-specific features.

As described herein and illustrated in FIGS. 9-10, the various operational and/developmental stages for implementation of the disclosed managed access to content and services can permit a logic separation of development a network services and related structure (e.g., layer(s), platform(s), system(s), sub-system(s), component(s), and the like) and application services (e.g., application services). Integration of such stages can permit development of integration solutions among disparate network services, disparate application services, and/or a network service and an application service. For example integration stages, such as integration layer can integrate at least one network service with at least one application service. In addition, in one aspect, the integration layer or a functional element thereof can be functionally coupled to an access network (one or network(s) 120), as shown in FIG. 9, which can permit exchange of information with at least one device. Similarly, the integration layer can be functionally coupled to a service delivery platform that can permit exchange of information with service consumers.

It should be appreciated that the integration layer and/or the access network can be geographically distributed and can include one or more of wireline network(s) or wireless network(s) that can operate in accordance with one or more communication protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols.

In view of the various operational features described herein, certain methods of the disclosure can be better appreciated with respect to the call flows in FIGS. 11A-21. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer; a server computer; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

Figure 18:
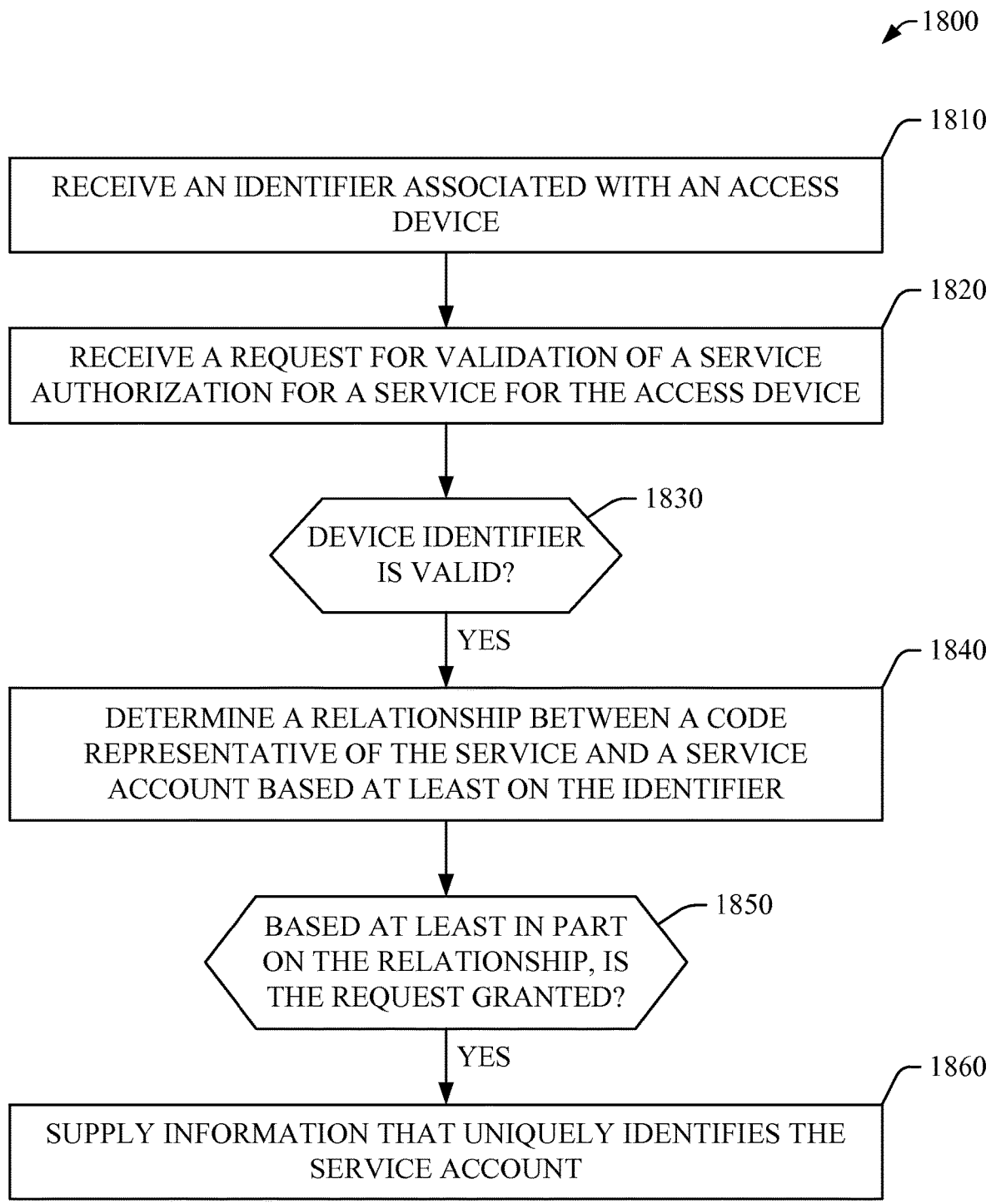

FIG. 18 illustrates a flowchart of an example method 1800 for managing access to a service in accordance with one or more aspects of the disclosure. One or more computing devices having at least one processor or being functionally coupled to at least one processor can implement (e.g., compile, execute, compile, and execute, etc.) one or more blocks of the subject example method 1800. In other scenarios, one or more blocks of the example method 1800 can be implemented in a distributed fashion by two or more computing devices contained in a system. Each of the two or more computing devices can have at least one processor or can be functionally coupled to at least one processor, where such processor(s) can implement at least one of the one or more block.

At block 1810, an identifier associated with an access device is received. In one aspect, receiving the identifier can comprise receiving one or more of an Internet protocol (IP) address or a medium access control (MAC) address. At block 1820, a request for validation of a service authorization for a service for the access device is received at block 1820. At block 1830, it is ascertained that the device identifier is valid or that the device identifier is invalid. In response to ascertaining that the identifier is valid, at block 1840, a relationship between a code representative of the service and a service account is determined based at least in part on the identifier.

At block 1850, it is ascertained that the request is granted or that the request is not granted based at least in part on the relationship that is determined at block 1840. In response to ascertaining that the request is granted, at block 1860, information that uniquely identifies the service account is supplied. In one aspect, supplying such information can comprise transmitting at least a portion of the information to a network node (e.g., a component of a back-office system (e.g., a portion of the backend architecture 110) associated with an access device) or to an access device (e.g., a STB).

Figure 17:
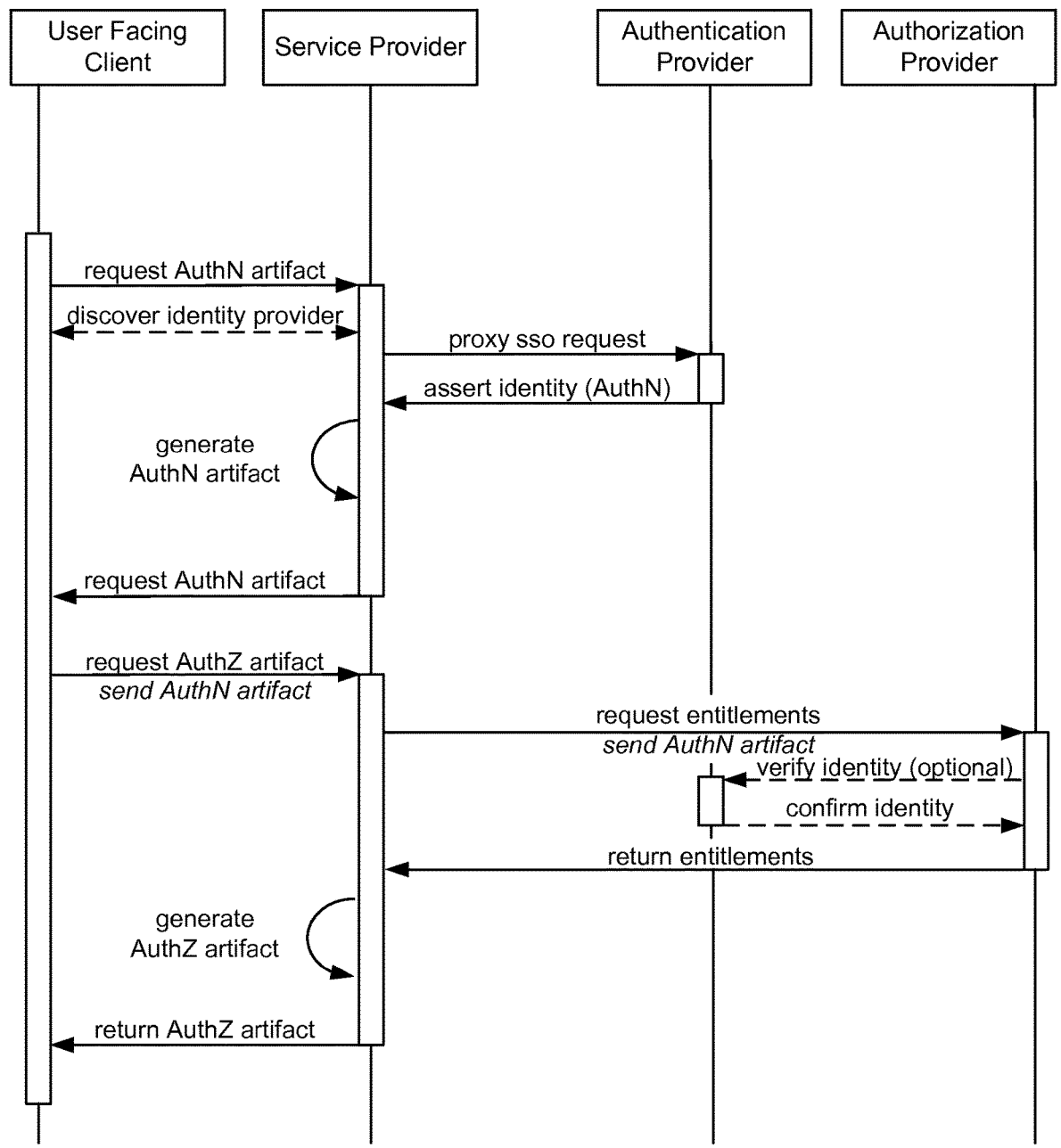

It should be appreciated that the example method 1800 can be an additional or alternative embodiment to the example method 1700 shown in FIG. 17.

Figure 19:
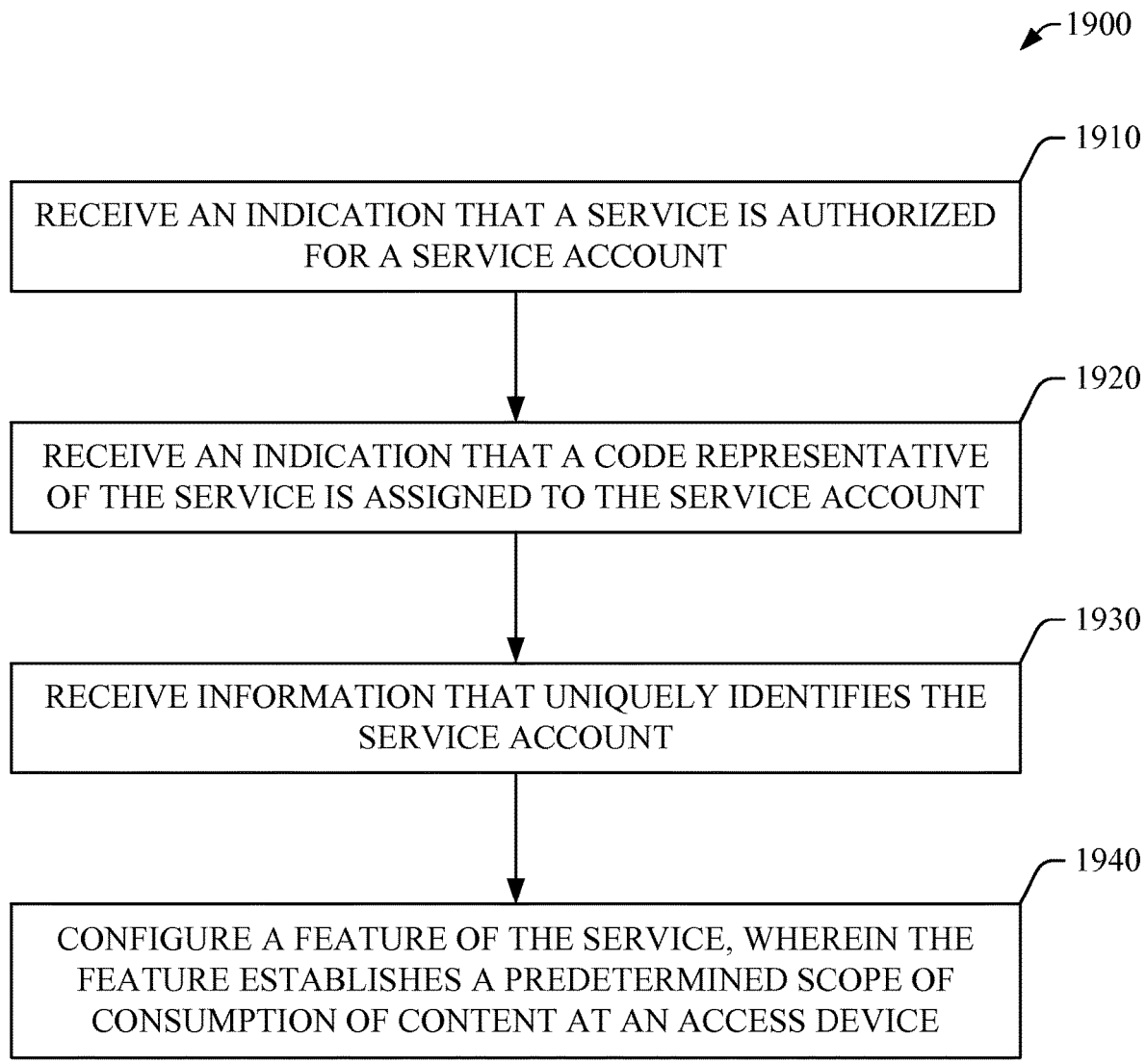

FIG. 19 illustrates a flowchart of an example method 1900 for managing access to a service in accordance with one or more aspects of the disclosure. At block 1910, an indication that a service is authorized for a service account is received. At block 1920, an indication that conveys that a code representative of the service is assigned to the service account is received. At block 1930, information that uniquely identifies the service account is received. At block 1940, a feature of the service is configured, wherein the feature establishes a predetermined scope of consumption of content at the access device. A feature of the service can be embodied in or can comprise information that requires and enhances the service. In one aspect, a feature of the service can be or can comprise a group of asset sources that may be authorized for a client device or a client component therein. For example, a feature of a content delivery service may include authorization of a client device to consume HBO and/or HBO On-Demand, or access to specific 1080P content. As another example, for a client device or an end-user associated with the client device that may be authorized for a streaming service, a feature of the service may include authorization for network DVR recording of the streaming service. Block 1940 can be referred to as a configuring operation. In one aspect, the configuring operation (or the configuring) can comprise authorizing the feature. In one aspect, the feature can be authorized at an access device, such as an STB. Yet, it should be appreciated that the feature can be authorized in other devices, e.g., customer premises devices, user equipment, wearable devices, or the like. In another aspect, the configuring can comprise providing access to a group of media assets, each media asset of the group of media assets is one of linear programming asset of a time-shifted asset (e.g., a VOD asset or an nDVR asset). In yet another aspect, the configuring can comprise providing at least one of access to downstream information at substantially a first rate (e.g., a download bitrate) or access to upstream information at substantially a second rate (e.g., an upload bitrate).

While in the illustrated embodiment the configuring operation is implemented in sequence from block 1930, it should be appreciated that the feature can be configured in response to one or more of receiving the indication that the service is authorized for the service account or receiving the indication that the code is assigned to the service account.

Figure 20:
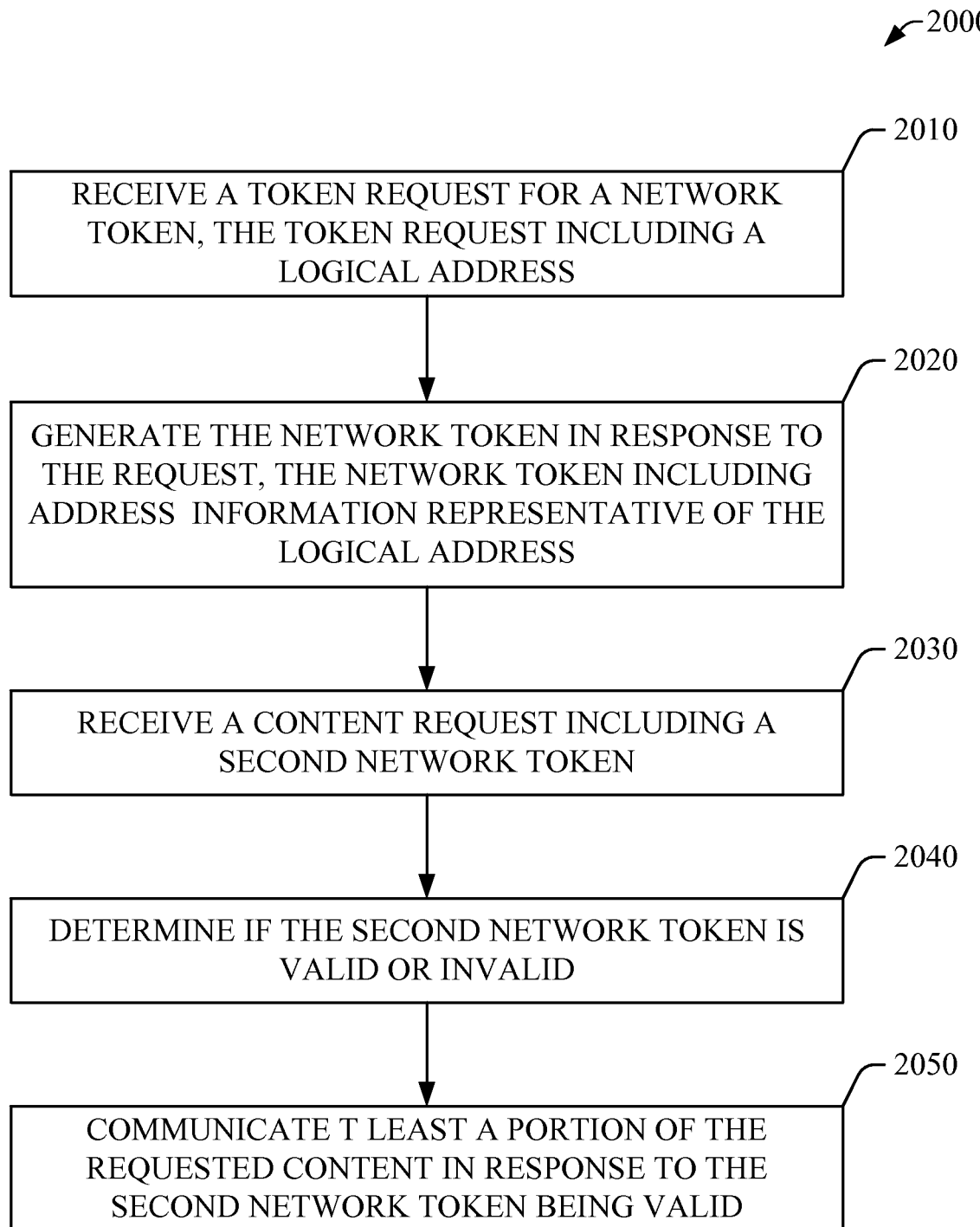

FIG. 20 illustrates a flowchart of an example method 2000 for validating a token in accordance with one or more aspects of the disclosure. At block 2010, a token request for a network token can be received. In one example, the token request can include a logical address (e.g., an IP address, a MAC address, or the like). At block 2020, the network token can be generated in response to the request, where the network token can include address information representative of the logical address. At block 2030, a content request can be received, where the content request can include a second network token. At block 2040, it can be determined if the second network token is valid or invalid. At block 2050, at least a portion of the content that is requested can be communicated in response to the second network token being valid.

It should be appreciated that in some embodiments, the subject example method 2000 can be as a virtual machine. In other embodiments, a service interface (e.g., an API "gateway") can associate a specific workflow to an interface specification, and in this case calls a token-authentication service before it calls many of the other services (e.g. the user authentication service or account authentication service). Service interfaces, e.g., a service gateway (SGW) can reside on the same physical hardware or not (e.g., a API gateway and token authentication service can be co-resident in the same computing cluster, and the user authentication system is remote (e.g., multiple user authentication systems may be supported).

Figure 21:
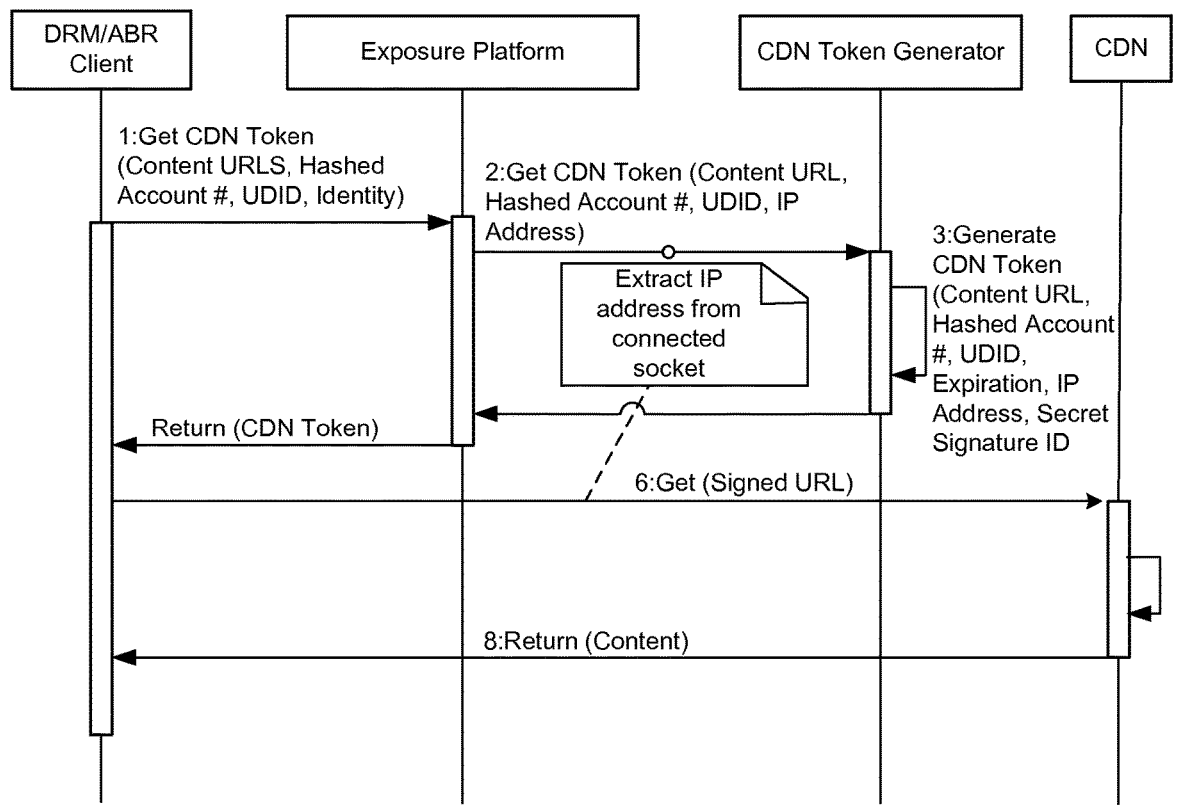

FIG. 21 illustrates an example process 2100 for providing security functionality in front of an EAPES in accordance with one or more aspects of this disclosure. As illustrated the an exposure platform in accordance with this disclosure can be leverage to exchange information between a client (e.g., a DRM or ABR client) and other network components, such as a CDN token generator unit and a CDN. The illustrated components can implement the example method 2000 and/or other methods described herein.

Figure 22:
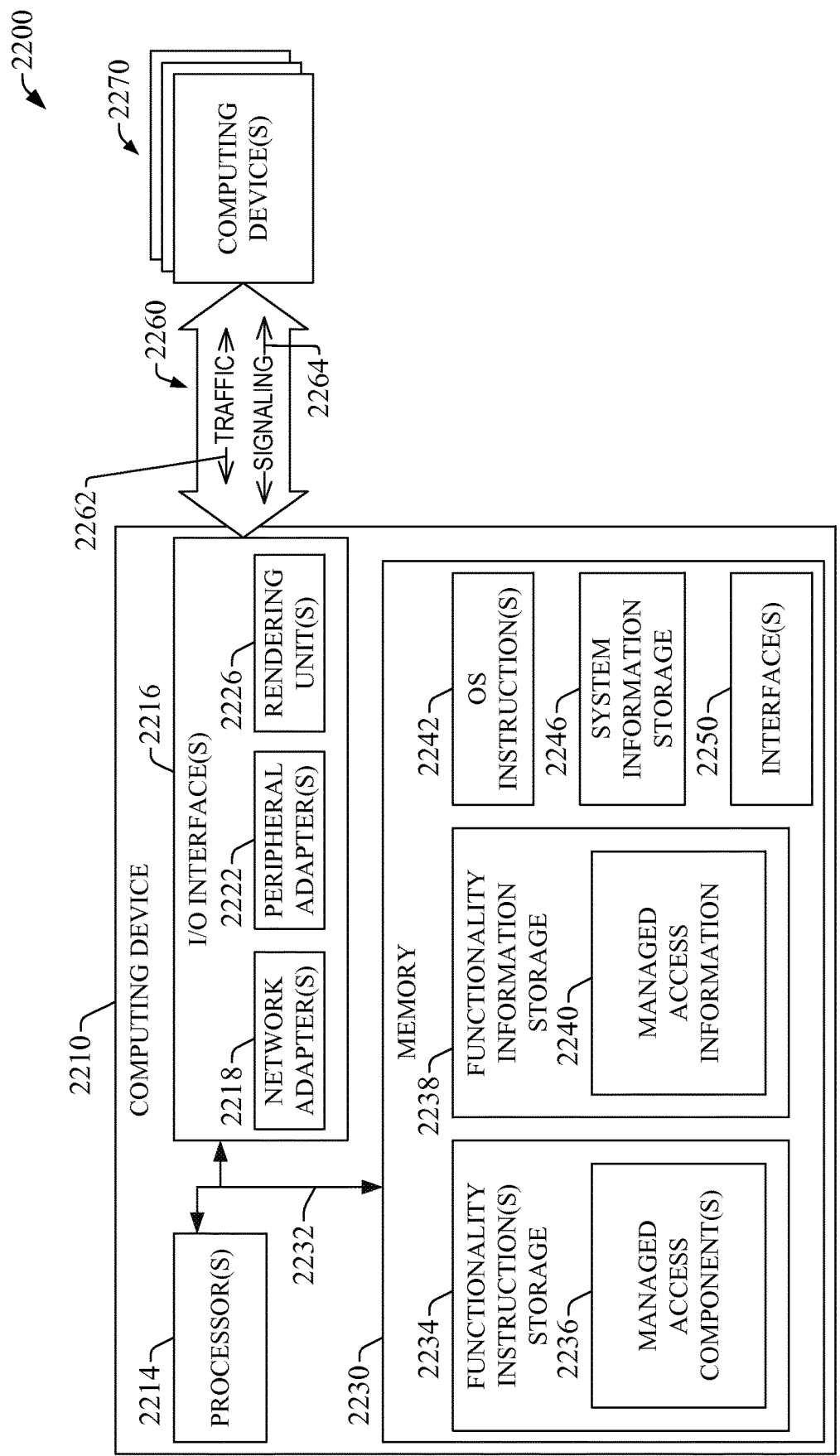
FIGS. 22-23 illustrated examples of computational environments in accordance with one or more aspects of the disclosure.
Figure 23:
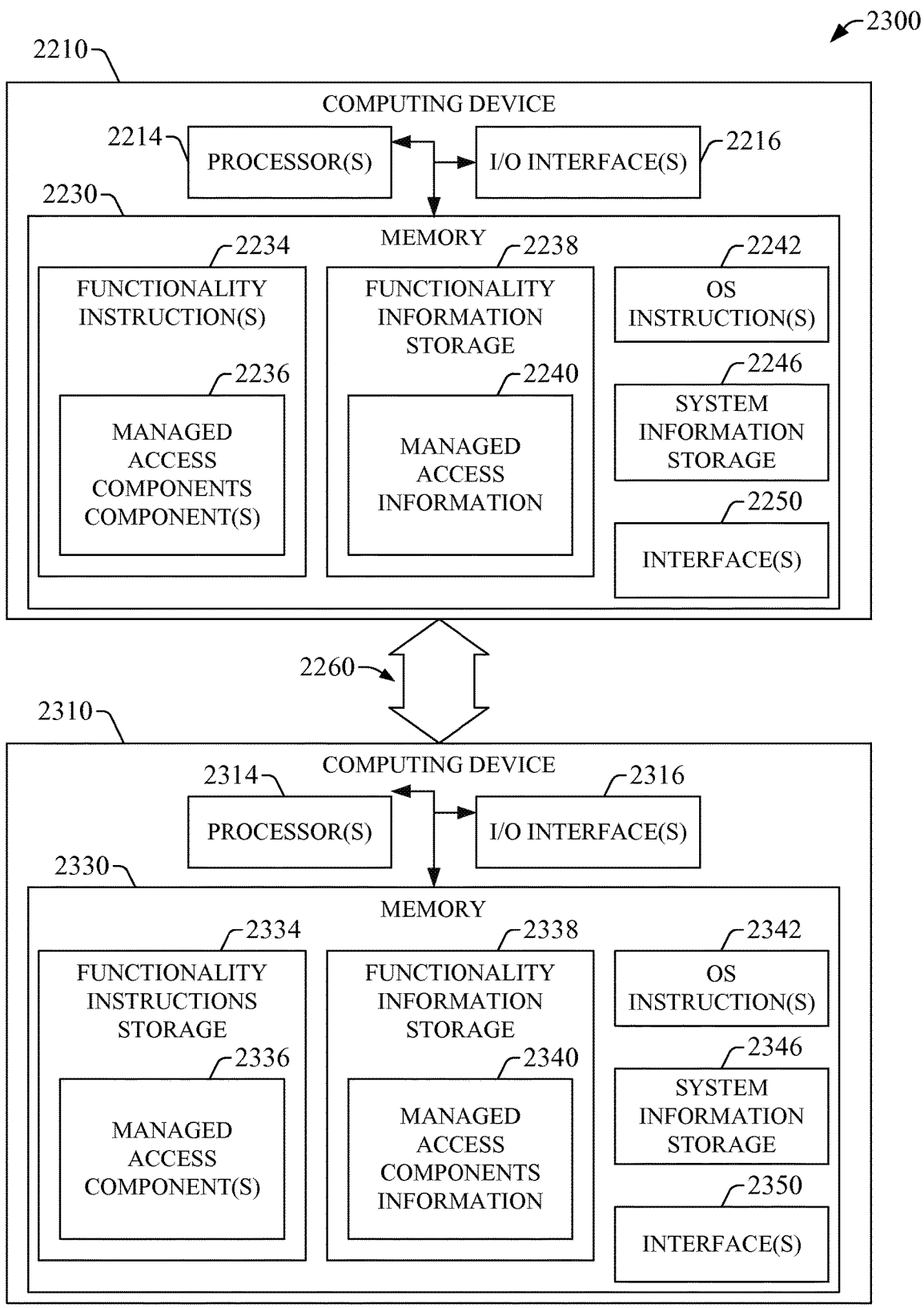

FIGS. 22 and 23 illustrate block diagrams of example operational environments for managed access to content and services in accordance with one or more aspects of the disclosure. These example operational environments are only illustrative and are not intended to suggest or otherwise convey any limitation as to the scope of use or functionality of the operating environments' architecture. In addition, the operational environments should not be interpreted as having any dependency or requirement relating to any one or combination of components illustrated in these example operational environments.

The operational environment 2300 represents an example software implementation of the various aspects or features of the disclosure in which the processing or execution of operations described in connection with managed access to content and services can be performed in response to execution of one or more software components at the computing device 2210. It should be appreciated that the one or more software components can render the computing device 2210, or any other computing device that contains such components, a particular machine for managed access to content and services, among other functional purposes. A software component can be embodied in or can comprise one or more computer-accessible instructions, e.g., computer-readable and/or computer-executable instructions. In one scenario, at least a portion of the computer-accessible instructions can embody one or more of the example methods presented in FIGS. 11A-21. For instance, to embody one such method, at least the portion of the computer-accessible instructions can be persisted in a computer storage non-transitory medium executed by a processor. The one or more computer-accessible instructions that embody a software component can assembled into one or more program modules, for example, that can be compiled, linked, and/or executed at the computing device 2210 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 2210 or functionally couple thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with managed access to content and services can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 2210 can comprise one or more processors 2214, one or more input/output (I/O) interfaces 2216, a memory 2230, and a bus architecture 2232 (also termed bus 2232) that functionally couples various functional elements of the computing device 2210. The bus 2232 can include at least one of a system bus, a memory bus, an address bus, or a message bus, and can permit exchange of information (data, metadata, and/or signaling) between the processor(s) 2214, the I/O interface(s) 2216, and/or the memory 2230, or respective functional element therein. In certain scenarios, the bus 2232 in conjunction with one or more internal programming interfaces 2250 (also referred to as interface(s) 2250) can permit such exchange of information. In scenarios in which processor(s) 2214 include multiple processors, the computing device 2210 can utilize parallel computing.

The I/O interface(s) 2216 permit communication of information between the computing device and an external device, such as another computing device, e.g., a network element or an end-user device. Such communication can include direct communication or indirect communication, such as exchange of information between the computing device 2210 and the external device via a network or elements thereof. As illustrated, the I/O interface(s) 2216 can comprise one or more of network adapter(s) 2218, peripheral adapter(s) 2222, and rendering unit(s) 2226. Such adapter(s) can permit or facilitate connectivity between the external device and one or more of the processor(s) 2214 or the memory 2230. In one aspect, at least one of the network adapter(s) 2218 can couple functionally the computing device 2210 to one or more computing devices 2270 via one or more traffic and signaling pipes 2260 that can permit or facilitate exchange of traffic 2262 and signaling 2264 between the computing device 2210 and the one or more computing devices 2270. Such network coupling provided at least in part by the at least one of the network adapter(s) 2218 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 2270 can have substantially the same architecture as the computing device 2210. In addition or in the alternative, the rendering unit(s) 2226 can include functional elements (e.g., lights, such as light-emitting diodes; a display, such as liquid crystal display (LCD), combinations thereof, or the like) that can permit control of the operation of the computing device 2210, or can permit conveying or revealing operational conditions of the computing device 2210.

In one aspect, the bus 2232 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB) and the like. The bus 2232, and all buses described herein can be implemented over a wired or wireless network connection and each of the subsystems, including the processor(s) 2214, the memory 2230 and memory elements therein, and the I/O interface(s) 2216 can be contained within one or more remote computing devices 2270 at physically separate locations, connected through buses of this form, in effect implementing a fully distributed system.

The computing device 2210 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 2210, and can comprise, for example, both volatile and non-volatile media, and removable and/or non-removable media. In one aspect, the memory 2230 can comprise computer-readable media in the form of volatile memory, such as random access memory (RAM), and/or non-volatile memory, such as read only memory (ROM).

The memory 2230 can comprise functionality instructions storage 2234 and functionality information storage 2238. The functionality instructions storage 2234 can comprise computer-accessible instructions that, in response to execution (by at least one of the processor(s) 2214), can implement one or more of the functionalities of the disclosure. The computer-accessible instructions can embody or can comprise one or more software components illustrated as managed access component(s) 2236. In one scenario, execution of at least one component of the managed access component(s) 2236 can implement one or more of the example methods illustrated in FIG. 11 through FIG. 21. For instance, such execution can cause a processor that executes the at least one component to carry out a disclosed example method. It should be appreciated that, in one aspect, a processor of the processor(s) 2214 that executes a managed access component 2236 can retrieve information from or retain information in a memory element 2240 in the functionality information storage 2238 in order to operate in accordance with the functionality programmed or otherwise configured by the managed access component(s) 2236. Such information can include at least one of code instructions, information structures, or the like. At least one of the one or more interfaces 2250 (e.g., application programming interface(s)) can permit or facilitate communication of information between two or more components within the functionality instructions storage 2234. The information that is communicated by the at least one interface can result from implementation of one or more operations in a method of the disclosure. In certain embodiments, one or more of the functionality instructions storage 2234 and the functionality information storage 2238 can be embodied in or can comprise removable/non-removable, and/or volatile/non-volatile computer storage media.

At least a portion of at least one of managed access component(s) 2236 or managed access information 2240 can program or otherwise configure one or more of the processors 2214 to operate at least in accordance with the functionality described herein.

It should be appreciated that, in certain scenarios, the functionality instruction(s) storage 2234 can embody or can comprise a computer-readable non-transitory storage medium having computer-accessible instructions that, in response to execution, cause at least one processor (e.g., one or more of processor(s) 2214) to perform a group of operations comprising the operations or blocks described in connection with the disclosed methods. Such computer-readable non-transitory storage media can embody or can be contained in a computer program product or article of manufacture.

In addition, the memory 2230 can comprise computer-accessible instructions and information (e.g., data and/or metadata) that permit or facilitate operation and/or administration (e.g., upgrades, software installation, any other configuration, or the like) of the computing device 2210. Accordingly, as illustrated, the memory 2230 can comprise a memory element 2242 (labeled OS instruction(s) 2242) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 2210 can dictate a suitable OS. The memory 2230 also comprises a system information storage 2246 having data and/or metadata that permits or facilitate operation and/or administration of the computing device 2210. Elements of the OS instruction(s) 2242 and the system information storage 2246 can be accessible or can be operated on by at least one of the processor(s) 2214.

It should be recognized that while the functionality instructions storage 2234 and other executable program components, such as the operating system instruction(s) 2242, are illustrated herein as discrete blocks, such software components can reside at various times in different memory components of the computing device 2210, and can be executed by at least one of the processo(s) 2214. In certain scenarios, an implementation of the managed access component(s) 2236 can be retained on or transmitted across some form of computer readable media.

The computing device 2210 and/or one of the computing device(s) 2270 can include a power supply (not shown), which can power up components or functional elements within such devices. The power supply can be a rechargeable power supply, e.g., a rechargeable battery, and it can include one or more transformers to achieve a power level suitable for operation of the computing device 2210 and/or one of the computing device(s) 2270, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 2218) to connect operationally to the conventional power grid. In another aspect, the power supply can include an energy conversion component, such as a solar panel, to provide additional or alternative power resources or autonomy for the computing device 2210 and/or one of the computing device(s) 2270.

The computing device 2210 can operate in a networked environment by utilizing connections to one or more remote computing devices 2270. As an illustration, a remote computing device can be a personal computer, a portable computer, a server, a router, a network computer, a peer device or other common network node, and so on. As described herein, connections (physical and/or logical) between the computing device 2210 and a computing device of the one or more remote computing devices 2270 can be made via one or more traffic and signaling pipes 2260, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, such as example embodiment 2300 shown in FIG. 23, one or more of the disclosed methods can be practiced in distributed computing environments, such as grid-based environments, where tasks can be performed by remote processing devices (computing device(s) 2270) that are functionally coupled (e.g., communicatively linked or otherwise coupled) through a network having traffic and signaling pipes and related network elements. In a distributed computing environment, in one aspect, one or more software components (such as program modules) can be located in both a local computing device 2210 and at least one remote computing device, such as computing device 2310. As illustrated and described herein, the at least one remote computing device, e.g., computing device 2310, can have substantially the same architecture and associated functionality as the computing device 2210. For instance, the computing device 2310 can comprise processor(s) 2314, I/O interface(s) 2316, and a memory 2330, where a bus architecture can couple functionally two or more of such elements. The memory 2330 can comprise a functionality instructions storage 2334 having one or more managed access component(s) 2336, and a functionality information storage 2338 having managed access information 2340. The memory 2330 also can comprise OS instruction(s) 2342 and system information storage 2346 that can permit, at least in part, operation and/or administration of the computing device 2310. One or more internal programming interfaces 2350 (represented as interface(s) 2350 in FIG. 23) can permit or facilitate exchange of information between the managed access component(s) 2336 and the functionality information storage 2338. In a scenario in which several components are present in the group of managed access component(s) 2336, at least one interface of the interface(s) 2350 can permit or facilitate exchange of information between at least two of such components.

In one implementation, the computing device 2210 and the computing device 2310 can embody or can comprise, respectively, one or more of the functional elements in the example operational environments described in FIGS. 1-6 and 24.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "platform," "system," "architecture," "interface," "unit," "node," "module," "engine," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "node," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide managed access to content and services in a network. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

The invention claimed is:

1. A method, comprising:
receiving, via a computing platform comprising at least one processor functionally coupled to at least one memory device, an identifier associated with an access device, from the access device, wherein the identifier is included in the payload of an authentication token;
determining, via the computing platform, that the authentication token is valid;
transmitting, via the computing platform, a service authorization token and a session token to the access device in response to ascertaining that the authentication token is valid;
receiving, via the computing platform, a request to validate a service authorization for a service providing media assets for the access device, wherein the validation of the service authorization comprises validating the service authorization token associated with the service of the media assets, and the session token;
determining, via the computing platform, a relationship between a code indicative of the service and a service account based at least on the identifier, in response to determining that the identifier is valid;
determining, via the computing platform, that the request is granted based at least in part on the relationship;
configuring, via the computing platform, a content entitlement feature of the service in response to receiving the indication that the code is assigned to the service account, wherein the content entitlement feature establishes a predetermined scope of consumption of the media assets at the access device in connection with the service;
transmitting, via the computing platform, an access token to the access device, based at least in part on the validation of the service authorization token, wherein the access token is associated with a content request for the media assets;
receiving, via the computing platform, the content request for the media assets, and the access token from the access device;
determining, via the computing platform, that the access token is valid;
transmitting, via the computing platform, the content request and a network access token to a content distribution platform hosting the requested media assets, in response to determining that the access token is valid, for the content request; and
transmitting, via the computing platform, instructions to the content distribution platform to transmit the requested content assets to the access device.

2. The method of claim 1, further comprising receiving, via the computing platform, an indication that the service is authorized for the service account.

3. The method of claim 1, wherein configuring, via the computing platform, the content entitlement feature of the service in response to receiving the indication that the code is assigned to the service account comprises authorizing the feature.

4. The method of claim 1, wherein receiving the identifier comprises receiving at least one of an Internet protocol (IP) address or a medium access control (MAC) address.

5. The method of claim 1, wherein the service authorization token comprises session token information and the content entitlement information.

6. The method of claim of claim 1, further comprising:
generating, via the computing platform, the network access token in response to determining that the access token is valid.

7. The method of claim 1, wherein the session token corresponds to the authentication of the identifier associated with the access device.

8. A system, comprising:
at least one memory device comprising computer-executable instructions encoded thereon; and
at least one processor functionally coupled to the at least one memory and configured, by the computer-executable instructions, to:
receive an identifier associated with an access device, from the access device, wherein the identifier is included in the payload of an authentication token;

ascertain that the authentication token is valid;
transmit a service authorization token and a session token, to the access device in response to ascertaining that the authentication token is valid;
receive a request to validate a service authorization for a service providing media assets for the access device, wherein the validation of the service authorization comprises validating the service authorization token associated with the service of the media assets, and the session token;
determine a relationship between a code indicative of the service and a service account based at least on the identifier, in response to determining that the identifier is valid;
ascertain that the request is granted based at least in part on the relationship;
configure a content entitlement feature of the service in response to receiving the indication that the code is assigned to the service account, wherein the content entitlement feature establishes a predetermined scope of consumption of the media assets at the access device in connection with the service;
transmit an access token, to the access device, based at least in part on the validation of the service authorization, wherein the issue token is associated with a content request for the media assets;
receive the content request for the media assets, and the access token from the access device;
determine, via the computing platform, that the access token is valid;
transmit the content request and a network access token to a content distribution platform hosting the requested media assets, in response to determining that the access token is valid, for the content request and
transmit instructions to the content distribution platform to transmit the requested content assets to the access device.

9. The system of claim 8, wherein the at least one processor functionally coupled to the at least one memory is further configured, by the computer-executable instructions, to receive an indication that the service is authorized for the service account.

10. The system of claim 8, wherein the at least one processor functionally coupled to the at least one memory is further configured, by the computer-executable instructions, to configure the content entitlement feature of the service in response to receiving the indication that the code is assigned to the service account comprises authorizing the content entitlement feature.

11. The system of claim 8, wherein receiving the identifier comprises receiving at least one of an Internet protocol (IP) address or a medium access control (MAC) address.

12. The system of claim 8, wherein the at least one processor is further configured to execute computer-executable instructions that cause the at least one processor to:
generate the network access token in response to determining that the access token is valid.

13. The system of claim 8, wherein the session token corresponds to the authentication of the identifier associated with the access device.

14. At least one non-transitory storage medium having instructions for content delivery encoded thereon that, in response to execution, cause at least one computing platform having at least one processor to perform operations comprising:

receiving an identifier associated with an access device, from the access device, wherein the identifier is included in the payload of an authentication token;
ascertaining that the authentication token is valid;
transmitting a service authorization token and a session token, to the access device in response to ascertaining that the authentication token is valid;
receiving a request to validate a service authorization for a service providing media assets for the access device, wherein the validation of the service authorization comprises validating the service authorization token associated with the service of the media assets, and the session token;
ascertaining that the identifier is valid;
determining a relationship between a code indicative of the service and a service account based at least on the identifier, in response to determining that the identifier is valid;
ascertaining that the request is granted based at least in part on the relationship;
configuring a content entitlement feature of the service in response to receiving the indication that the code is assigned to the service account, wherein the content entitlement feature establishes a predetermined scope of consumption of the media assets at the access device in connection with the service;
transmitting an access token, to the access device, based at least in part on the validation of the service authorization token, wherein the access token is associated with a content request for the media assets;
receiving, via the computing platform, the content request for the media assets, and the access token from the access device;
determining, via the computing platform, that the access token is valid;
transmitting, via the computing platform, the content request and a network access token to a content distribution platform hosting the requested media assets, in response to determining that the access token is valid, for the content request; and
transmitting, via the computing platform, instructions to the content distribution platform to transmit the requested content assets to the access device.

15. The at least one non-transitory storage medium of claim 14, the operations further comprising receiving an indication that the service is authorized for the service account.

16. The at least one non-transitory storage medium of claim 15, the operations further comprising receiving an indication that the code is assigned to the service account.

17. The at least one non-transitory storage medium of claim 14, wherein the content entitlement token comprises the content entitlement information.

18. The at least one non-transitory storage medium of claim 14, wherein the instructions further cause the at least one computing platform to perform an operation comprising:
generating the network access token in response to determining that the access token is valid.

19. The at least one non-transitory storage medium of claim 14, wherein the session token corresponds to the authentication of the identifier associated with the access device.

* * * * *